United States Patent
Ouimette et al.

(10) Patent No.: US 10,530,928 B1
(45) Date of Patent: Jan. 7, 2020

(54) ANSWERING MACHINE DETECTION ("AMD") FOR A CONTACT CENTER BY USING AMD META-DATA

(71) Applicant: Noble Systems Corporation, Atlanta, GA (US)

(72) Inventors: Jason P. Ouimette, Berkeley Lake, GA (US); Karl H. Koster, Sandy Springs, GA (US); James K. Noble, Jr., Marietta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 407 days.

(21) Appl. No.: 15/459,861

(22) Filed: Mar. 15, 2017

(51) Int. Cl.
| | |
|---|---|
| *H04M 1/64* | (2006.01) |
| *H04M 3/51* | (2006.01) |
| *H04M 3/42* | (2006.01) |
| *H04M 3/56* | (2006.01) |
| *G10L 25/51* | (2013.01) |
| *G10L 25/69* | (2013.01) |

(52) U.S. Cl.
CPC ........... *H04M 3/5158* (2013.01); *G10L 25/51* (2013.01); *G10L 25/69* (2013.01); *H04M 3/4211* (2013.01); *H04M 3/56* (2013.01); *H04M 2203/2027* (2013.01)

(58) Field of Classification Search
CPC .............. H04M 2203/2027; H04M 3/5158
USPC ............................................ 379/88.01–88.19
See application file for complete search history.

(56) References Cited

U.S. PATENT DOCUMENTS

| | | | |
|---|---|---|---|
| 5,371,787 A | 12/1994 | Hamilton | |
| 5,581,602 A | 12/1996 | Szlam et al. | |
| 5,828,731 A | 10/1998 | Szlam et al. | |
| 6,850,602 B1 * | 2/2005 | Chou | H04M 3/5158 379/80 |
| 8,065,146 B2 | 11/2011 | Acero et al. | |
| 8,224,362 B1 | 7/2012 | Osinga | |
| 9,596,578 B1 | 3/2017 | Clark et al. | |
| 2002/0051522 A1 * | 5/2002 | Merrow | H04M 1/82 379/88.01 |
| 2004/0037397 A1 * | 2/2004 | Roby | H04M 3/5158 379/88.01 |

(Continued)

OTHER PUBLICATIONS

Asterisk-Users—AMD Detect Answering Machine, printed from http://lists.digium.com/pipermail/asterisk-users/2012-February/269986.html on Mar. 1, 2017, dated Feb. 3, 2012, 3 pages.

(Continued)

*Primary Examiner* — Solomon G Bezuayehu

(57) ABSTRACT

Answering machine detection ("AMD") processes in a contact center are improved by obtaining and storing AMD meta-data about a known greeting from an automatic voice messaging capability ("AVMC") on a telephone call to a known number. The AMD meta-data is used in subsequent calls to that known number and the greeting detected is analyzed using the AMD meta-data to make a comparison determination if AMD meta-data obtained from the current greeting matches that stored so as to determine whether the current greeting originated from an AVMC or from a live person. In certain embodiments, a real-time speech analytics ("RTSA") system is used for processing the greeting to obtain the AMD meta-data which is stored and used when comparing subsequently obtained AMD meta-data. Calls to telephone numbers for which there is no stored AMD meta-data results in analyzing the greeting in order to obtain and store AMD meta-data.

20 Claims, 17 Drawing Sheets

- A  Time Before Speech Detected – Initial Silence
- B  Silence Time Between Words
- C  Silence After Greeting
- D  Minimum Duration of Speech to be Considered a Word
- E  Duration of Analysis
- F  Duration of Greeting

(56) References Cited

U.S. PATENT DOCUMENTS

| | | | |
|---|---|---|---|
| 2006/0056600 A1 | 3/2006 | Merrow et al. | |
| 2007/0121894 A1 | 5/2007 | Noble, Jr. | |
| 2008/0015846 A1* | 1/2008 | Acero | G10L 15/22 704/201 |
| 2011/0216888 A1* | 9/2011 | Bhasin | H04M 1/64 379/88.01 |
| 2012/0230483 A1* | 9/2012 | Bouzid | H04M 3/5158 379/201.02 |
| 2014/0220526 A1* | 8/2014 | Sylves | G06Q 30/0201 434/238 |
| 2014/0369479 A1* | 12/2014 | Siminoff | H04M 3/5158 379/88.01 |
| 2017/0163804 A1* | 6/2017 | Bouzid | H04M 3/5158 |

OTHER PUBLICATIONS

Asterisk Answering Machine Detection—Always Detects Receiver as Machine, printed from http://stackoverflow.com/questions/15714996/asterisk-answering-machine-detection-amd-always-detects-receiver-as-machine on Mar. 1, 2017, 3 pages.

WombatDialer: Effective Anwering-Machine Detection (AMD), printed from www.loway.ch, dated Jan. 1, 2016, 5 pages.

Diversion Indication in SIP, RFC 5806, Internet Engineering Task Force, ISSSN 2070-1721, Mar. 2010, 53 pages.

U.S. Appl. No. 15/700,389 Office Action, dated Dec. 14, 2017, 17 pages.

U.S. Appl. No. 15/608,405 Office Action dated Dec. 14, 2017, 20 pages.

U.S. Appl. No. 15/700,389, Notice of Allowance, dated Oct. 3, 2018, 19 pages.

U.S. Appl. No. 15/608,405, Office Action dated Jul. 6, 2018, 16 pages, USPTO.

U.S. Appl. No. 15/700,389, Office Action dated Jul. 27, 2018, 6 pages, USPTO.

U.S. Appl. No. 15/608,405, Notice of Allowance dated Jan. 24, 2019, 8 pages.

U.S. Appl. No. 16/160,330, Office Action dated Apr. 19, 2019, USPTO, 6 pages.

* cited by examiner

ANSWERING MACHINE DETECTION ("AMD") FOR A CONTACT CENTER BY USING AMD META-DATA

FIELD OF THE DISCLOSURE

The concepts and technologies disclosed herein generally pertain to improving answering machine detection for an outbound call that originated from a contact center based on analysis of a greeting received after the call has been answered.

BACKGROUND OF THE INVENTION

Contact centers originate outbound telephone calls for various reasons. In various applications, the calls may be directed to wireline or wireless telephone numbers and are made for the purpose of either playing an announcement or connecting an agent to speak with the called party after they have answered the call. When connecting the agent to speak with the called party after the call is answered, it may be desirous to avoid connecting the agent if an answering machine answers the call. In various contexts, if this occurs, the agent may disposition the call as being answered by an answering machine. Dispositioning the call involves the agent entering information that characterizes the outcome of the call. One way to avoid the agent being connected to an answering machine that has answered the call is to employ automation that detects and determines whether the greeting received after call has been answered has been provided by a "live" person or a voice mail/answering machine. Once it is determined that the call has been answered by a live person, then the agent may be connected to the call. If it is determined that the call has been answered by an answering machine or voice mail service, then the call may be terminated or an announcement may be played. The process of determining whether the greeting is from a live person or an answering machine is frequently known in the industry as "answering machine detection" ("AMD").

Accurately determining whether a live person or not has answered the call is important, because it increases the agent's efficiency and avoids wasting time. However, accurately determining whether a live person has answered can be difficult to determine in various situations. Typically, algorithms and techniques that detect a live person versus an automated technology are often somewhere in the 90%+ accuracy range. However, this type of accuracy measurement must be further qualified, since there are different ways of measuring accuracy. However it is measured, increasing the accuracy directly correlates to reducing wasted agent time and increasing agent productivity, so there is an obvious motivation to increase the accuracy of answering machine detection.

SUMMARY

Various embodiments are disclosed for providing increased accuracy in distinguishing whether a greeting has been provided by a live person or a voice mail/answering machine that has answered an outgoing call from a contact center.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
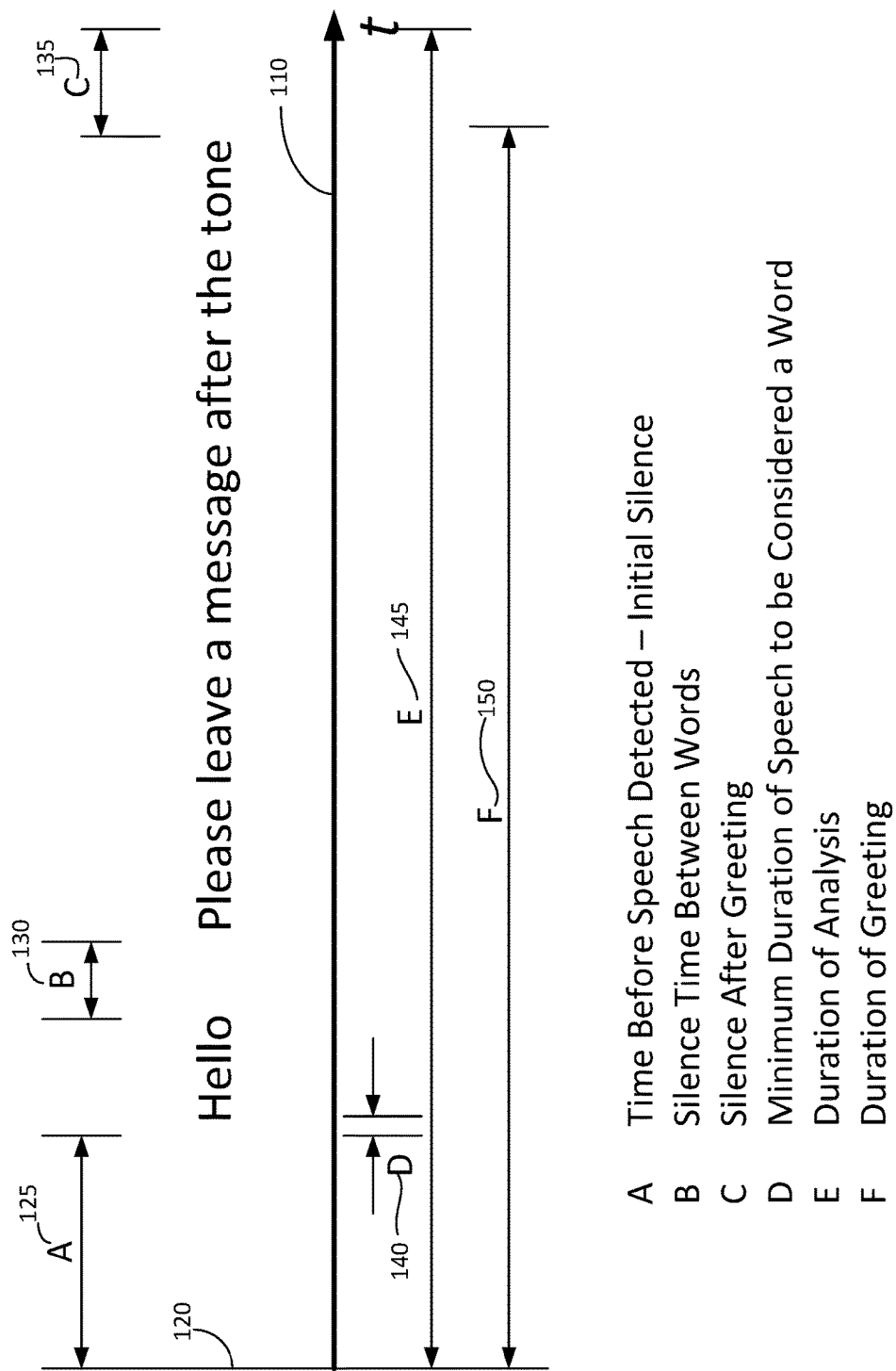
FIG. 1 illustrates some concepts involving timers used in the analysis of a greeting for purposes of ascertaining whether the greeting originated from a live person or a machine.

Contact centers originating outbound voice telephone calls frequently attempt to maximize agent utilization by only connecting the agent the when a live person (or simply "person") answers the call. The outbound call will normally encounter a limited number of outcomes after it is originated. At a high level, assuming the network successfully routes the call to the remote interface, the outbound call may be offered to the called party (i.e., causing the phone to ring) but without being answered. Another outcome is that the call could be offered and answered.

If the call is answered, then there are typically two possibilities. First, the call may be answered by a live person (i.e., an actual human being). In this case, the equipment used by the contact center for originating the call will connect the agent to the call, so the agent can converse with the answering party. In another alternative, the call may be answered by an automated system of some form. The automated system could be an answering machine or a voice mail system. The main distinction herein between these two options is largely that of ownership and control. If the equipment is owned and operated on the premises of the called party (as is the case with a conventional electronic answering machine connected to a home phone), it is referred to as an "answering machine" herein. In other cases, the called party has a service whereby unanswered calls are forwarded to network owned equipment that answers the call and takes a message. In such cases, the service is commonly referred to as "voice mail service." In this case, the subscriber does not own or maintain the equipment, but typically pays a service fee to the carrier. However, as commonly known, both answering machines and voice mail systems will "pick up" an unanswered telephone call, play a welcome greeting to the caller, and record a message from the caller. Although there are some distinctions between their features and operational aspects, these are largely not relevant to the present invention. Both options play a greeting to the caller, allow a caller to leave a message, then, at a later time, the called party can retrieve their messages at their convenience. For purposes of simplicity, the terms "automated voice messaging capability" ("AVMC"), "answering device", "automated device", or simply "machine" are used herein and intended to encompass either a premise-based answering machine or a service provider's voice mail service.

When the contact center encounters an AVMC answering the call, the agent is frequently not connected to the call, since there is no person to speak with. The contact center may, instead, terminate the call or play a message to the answering device. Thus, it becomes evident that properly distinguishing between a person answering the call versus a machine is important to the contact center operator. Connecting the agent to an AVMC, when it is not desired to do so, wastes the agent's time and increases costs. The determination of whether the call has been answered by a person or an automated device is commonly referred to in the contact center industry as the process of "answering machine detection" or "AMD." Referring to this as "answering machine detection" is somewhat of a misnomer, as it is intended to also include detection of voice mail systems as well. To avoid confusion, the term "AMD" is used herein to refer to the detection of any automated machine detection or AVMC, and is not limited to detecting only answering machines per se. Reference to an answering machine per se is reflected by using the term "answering machine."

If the called party is a wireless subscriber, it is common that the wireless carrier will provide voice mail service to their subscriber. Thus, if the wireless phone is not answered, cannot be located, or is turned off, the call will be forwarded to a carrier operated AVMC system that will answer the call, play a welcome greeting, and store a message. If the called party is a wireline subscriber, then an answering machine may be encountered, which will answer the call after a set number of rings, play a greeting, and record the caller's message. In other cases, the wireline subscriber may subscribe to a service provider's voice mail service, which will forward the call to a voice mail system. While it is common to encounter both answering machines and voice mail services when calling wireline numbers, only voice mail services are typically encountered when calling a wireless number.

The Welcome Greeting

The welcome greeting of an AVMC may be recorded by the subscriber in whole or in part, or it may be a default greeting. Frequently, individuals may record their own greeting as a way to customize the message that a caller will hear. This is often required when a user first "sets up" a voice mail account or an answering machine. There are a wide variety of messages that individual may record for a caller to hear. Some may be humorous, short, lengthy, or generic. Some common generic messages formats include (where the customer's name or number of the called party is shown in brackets "[ ]"):

"You have reached the [Smith] residence. No one is here to take your call. Please leave a message after the tone, and we will call you back."

"Hello, this is [Sam]. I can't get to the phone now—leave a message after the beep."

"You have reached [404 881-1331]. Please leave your message."

In other cases, an AVMC system may have a default greeting that is used if the person has not recorded a custom announcement. Such an announcement may take the form of:

"The person you have dialed is not available. Please leave a message after the tone. After you are done, please hang up."

Still other AVMC systems may offer a limited custom greeting, where the subscriber is prompted to say their name, and it is inserted into a greeting, such as:

[John Doe] is unavailable. Please leave your message after the tone. After you are done, you may hang up or press 1 for more options."

Such various greetings are commonly known, and no doubt other variations are possible. Some greetings may include sounds, music, or other special effects. However, in most instances, they are characterized as being different from the response a live person typically provides when answering a call. A common answer provided by a person answering a phone is simply "hello." Thus, a simple basis for distinguishing between a live person's greeting and an AVMC's greeting is the length of the greeting. For simplicity, the distinction is frequently simply referred to herein as determining whether the greeting is provided by a "person" or "machine."

Obviously, there are situations where an answering party may answer by stating something more than merely "hello." For example, many people may answer by stating: "hello, this is [Sam] speaking." Thus, the greeting may be longer than a simple "hello," and it may require more sophistication in the technology used in discriminating whether the greeting is provided by a live person or an AVMC. Many conventional AMD mechanisms rely on detection of energy levels of the audio and their timing in order to determine whether the speech of the greeting of a machine or a live person.

Deconstructing the Greeting

Turning to FIG. 1, some basic timing parameters are shown that may be used to delimit and characterize a greeting. In this embodiment, the greeting is a simple "Hello" followed by a brief pause, and then the instruction "Please leave a message after the tone." This represents a typical greeting that a caller would hear when encountering an AVMC. However, the principles of delimiting the speech apply to a greeting providing by a live person. In FIG. 1, a timeline 100 is shown that represents the passage of time. The beginning of the timeline 120 begins when the call is connected with the called party, i.e., when the AVMC answers the call. This results in a backwards signaling message that is conveyed to the originating contact center, which informs the contact center that the call has been answered. Thus, although a caller may recognize this by hearing a "click" or other sound, a dialer in a contact center will know this from the signaling message conveyed by the communications carrier. Various signaling mechanisms based on telephony signaling, Voice over IP ("VoIP") signaling, ISDN, etc. are known to those skilled in the art.

In one embodiment, the basic parameters are based on analyzing the presence of audio energy in some form. The presence of audio energy is a proxy for voice. Thus, the comparison involves determining, at a high level, whether voice or the absence of voice (silence) is present. This can also be referred to as analyzing silence and non-silence. For this reason, this approach is referred to herein as a "timer-based" approach, since it relies on defining various timer values representing different situations of when voice or silence is detected.

Frequently there is some background sound (noise) that may be captured, so some means are necessary to distinguish between what is likely background noise versus voice. This can be done by a signal-to-noise ratio for analog signals, determining if the audio is above a certain threshold for digital signals, or some other means. Those skilled in the art can identify other ways in which the presence of voice and relative silence can be detected and distinguished. For purposes herein, this type of analysis can be considered as a form of "non-linguistic" AMD. It is referred to as "non-linguistic" because it is fundamentally not concerned (in most cases) with the words, the meaning of the words, or the phonetics of the words. Rather, it is predicated on detecting silence versus speech for various time periods. Further, the detection of speech is based on the presence of audio data above a certain volume level and longer than a minimum duration.

Typically, there is a pause, or time period of initial silence before speech is provided by the AVMC. This is shown as Time Period A 125. The time between words is shown as a silence time in Time Period B 130. This is the inter-word silence (or silence between words) and may be used to detect the end of one word and the beginning of another.

The total time that the system may allocate to analysis of the greeting is defined by Time Period E 145, and this is required to be known in order to determine whether there is any silence after the greeting, as shown by Time Period C 135. In this example, the greeting ends before the maximum allocated analysis time 145, so there is silence time after the greeting 135. (This is not always the case.) The end time of the greeting is indication by Time Period F 150.

Time Period D 140 reflects the minimum duration of voice (i.e., speech energy) that is required to be considered as speech. Frequently, there may be spurious background noises when a greeting is recorded or a live person picks up a phone. These could be so short, i.e., shorter than Time Period D, so as to not be considered speech. Although not shown, the speech energy has to have a minimum level of energy (i.e., volume) in order to be considered speech. If the volume is below a certain level, it is presumed to be background noise. Similarly, if it is above the level, but too short in duration, it is presumed to be background noise.

Not shown in FIG. 1 is the point when a determination may be made when that the greeting is from a machine or a person. This may occur prior to the maximum amount of time for analyzing the greeting, because in many instances a sufficiently confident determination can be made prior to the maximum amount of time. Generally, if a determination can be made sooner, with the same level of confidence, that is preferable than taking a longer time. If the determination is made sooner, but with a lower level of confidence, that is not necessarily preferable.

It should be appreciated that the terms described above can be equally described in various ways. The period of initial silence of Time Period A 125 represents silence until the first word is detected, which could be described as "initial silence", "initial silence duration", "time before first speech is detected," "pre-speech silence", etc. It should be apparent from the context and description as to the purpose of the various time periods regardless of how each are worded, and a different descriptor could be used in many instances without changing the principles disclosed herein.

Without knowing the semantics of the spoken words in the greeting, it becomes evident that distinctions can be made between speech of the greeting provided by a live person answering a call and speech of an AVMC. The difference may be based on the relative time periods of when silence and non-silence (speech) are detected. The detection of speech is somewhat of a misnomer, since in many systems the detection of speech is actually based on detecting audio signals or the presence/absence of audio energy in some form. In many instances, conventional AMD systems do not ascertain whether the audio is actually intelligible speech, as opposed to some other audible sound. Thus, in some systems, music could be confused for speech. As indicated earlier, there are threshold limits as to how "loud" the sound has to be in order to be considered as "voice" or "speech." In some embodiments, a "silence threshold" is defined as a numerical value, which distinguishes between silence and speech. This could be a value selected between e.g., 1 and 1000. Other embodiments may have a range from 0 to 32,767. A typical threshold value in this latter range may be e.g., 256 or 384.

Consider first the initial silence period shown in FIG. 1, Time Period A. In some systems, this is set at a value of 2500 milliseconds ("ms"). This value can also be referred to as a timer value. In other words, if the initial speech is detected below this timer value or threshold, it is assumed to be a live person. If the initial speech is detected above this threshold, it is presumed to be an AVMC. Thus, the expiry of this timer value may be use to indicate the type of greeting (i.e., person or machine). Typically, a person picking up a telephone will bring the receiver to their mouth and utter the word "Hello" with minimal delay. Thus, the time between answering the call and speaking is relatively short. On the other hand, when recording a greeting on an AVMC, the user is prompted to state a greeting after a beep, and may hesitate for a moment. Thus, when the AVMC answers a call, it will play the greeting with the embedded initial silence period.

However, for every generality, there are exceptions. A busy person may pick up a phone, and be distracted for a moment before stating "hello." This would contribute to a longer initial silence period. Thus, it cannot be presumed that in every case that the expiry of this timer accurately indicates an AVMC system answering the call. Typically, the timer values are set to be optimized for the general case.

As can be expected, a confidence value may be associated with each determination. Using the above example, if the Time Period A is set to 2500 ms, and audio is detected at 2501 ms, that would suggest an AMVS, but likely with a low confidence level. Similarly, detection of audio at 2499 ms suggests the audio is from a person, but this again has a low confidence level. A determination of the confidence level is possible, based on the actual value encountered relative to the time. Thus, rather than simply providing a determination, the determination along with a confidence value may be provided. In such cases, it may be wise to consider other parameters and characteristics to bolster or refute an initial determination having a low confidence level.

Time Period B may be used to delimit words. It is quite often that when recording a greeting, the user will clearly and slowly enunciate the words of the greeting. Thus, detection of the inter-word silence period allows determination of the number of words spoken. In many cases, there are more words spoken in a greeting by an AVMC as opposed to the greeting of a live person. Frequently, a person will simply state "hello" when answering the phone whereas the AMVS provides further instructions. Although detection of words is possible by detecting speech/silence, typically there is no comprehension of the words themselves in the timer-based AMD algorithm.

The after-greeting silence, Time Period C 135 also reflects this distinction between a short versus long greeting. At noted earlier, Time Period C 135 is defined in relation to the overall time allocated for analysis, Time Period E. Thus, Time Period C will have a longer value if the speech is shorter, such as if a live person merely answers with "hello" as opposed to an AVMC providing a longer greeting. In some embodiments, a value of 500 ms is used, wherein a value of a greeting exceeding this are deemed an AVMC and lower than 500 ms is deemed a live person.

The ability to measure silence between words requires a number of parameters. This includes Time Period B, coupled with a minimum level for determining a sound is a word, along with the minimum duration of a word, allows determination of the number of words during the analysis period, Time Period E 145. Typically, an AVMC greeting will have more words than a live person's greeting. Thus, a threshold value of four words may be defined as a delimiter, wherein four or more words are determined to be an AVMC and three or fewer words are presumed to indicate a live person.

A maximum allowable duration of the greeting, Time Period F 150, may be defined. A person answering the phone will typically enter a shorter greeting than would be found on an AVMC. A live person may also speak faster, as the purpose may be merely to inform the calling party that they have answered. Thus, a live person may simply say, e.g., "yes", "hello", or [Smith] speaking", which may be a duration of under a second or two. However, an AVMC will have a greeting that is longer, typically longer than a second or two. In some embodiments, a default value of 1500 or 5000 ms is defined, such that when a longer greeting is detected, it is presumed to be an AVMC and when a shorter greeting is detected, a live person is presumed. It can be appreciated that if the greeting continues beyond this time period of when the analysis occurs, it is likely that there will be no silence after the greeting, since the greeting exceeds the analysis time. This further suggest that an AVMC is providing the greeting.

Another method of determining whether the speech is a live person of an AVMC involves measuring a duration of silence after the initial word. This involves monitoring the first instance of Time Period B 130. This reflects that a person answering a phone will likely offer a single, initial word greeting, such as "hello." In other embodiments, they may offer a rapidly spoken phrase, such as "[Smith] Residence" or "[Smith] speaking" such that it may be interpreted as a single word. In some embodiments, the Time Period B is set to a default value of 250 ms wherein a shorter value means separate words have not been detected and a longer time means separate words are presumed. A word typically is presumed to have a 300 ms duration. Thus, stating "[Smith] speaking" very rapidly may be interpreted as a single word. Frequently, if there is no immediate response, the called party (i.e., a live person) will wait a moment, and then restate their greeting or utter a follow up word ("hello?"). This would give rise to a value of Time Period B, inter-word silence, that will exceed a threshold and would be greater than if the second word was intended to be spoken in a fluid manner. For example, an AVMC greeting stating "Hello [pause] Leave a message" will have a slight pause between the "hello" and "leave." However, a live person upon stating their initial greeting and hearing silence would likely wait a longer period prior to restating their greeting. Thus, measuring the relative duration of Time Period B can further distinguish between a live person and an AVMC.

It should be apparent that are a number of timer values can be defined which would indicate or suggest a determination of whether the audio greeting originates from a person or AVMC. Further, it is apparent that a variety of algorithms and values could be defined to process the timers in order to generate such a determination of whether the greeting is from a machine or live person. While in some instances a single variable may be highly dispositive of the outcome, in other cases, a number of variables may be considered and may provide a more accurate outcome.

For purposes of reference, a variable or variables that cause such a determination of where the greeting originated from is referred as a "trigger." Thus, in one call, the algorithm may recognize a single timer to make a determination, whereas in another call, the algorithm may use multiple variables or timers. The determination of the originator of the greeting may be manifested in a signal called herein as the Greeting Type Indicator ("GTI") which provides a greeting type indication (the concepts are somewhat interchangeable, i.e., the GTI signal indicates information which itself is an indication). The GTI could be triggered using one, two, or more timers.

For example, a very short initial greeting word ("hello") followed by nothing else, could be characterized by a short duration (e.g., less than 600 ms). If the audio greeting comprises a single speech utterance of less than 600 ms it may be deemed a live person and a single timer may be used to trigger the determination of the originator of the greeting. In some embodiments, once this is determined using this timer, the maximum time of analysis may be shortened or terminated since it is relatively likely the audio is that of a live person. However, an audio greeting comprising an utterance of 641 ms does not mean the greeting is necessarily from a machine. In this case, the maximum time of analysis may be performed and other indicators are considered before generating the GTI. For example, if "hello" is the only utterance during the entire analysis, as reflected by a long Time Period C of silence after the greeting, then, this condition may be reported as a live person. The number of timers and their values used to trigger the GTI is dependent on the algorithm implemented for making the determination.

It can be appreciated that the timers shown in FIG. 1 are not exhaustive. Further, great flexibility is afforded for how the algorithms may process the values. It could that, e.g., when a single particular timer threshold is exceeded, a determination is made and the GTI is triggered. In other embodiments, the value of the particular variable is compared to the threshold, to ascertain a confidence level, and based on the confidence level, other timer values are used to make a determination of the type of greeting is encountered. Only then is the triggering of the GTI occur.

Furthermore, it can be appreciated that the modification of particular value of the default timers, may depend on various factors. For example, the set of default timer values may be optimized for a certain part of the country where the called person resides in. It is recognized that in certain parts of the country, people may speak faster or slower relative to other individuals in other parts of the country. Thus, in a region where called parties may speak faster, shorter default values may be used. Whereas in other areas, longer timer values may be used. It can be appreciated that this may even vary based on the age of the called person. For example, elderly persons may speak slower than, e.g., middle age or younger persons. Thus, it may be possible to adapt by using different timer values based on the characteristics of the region being called or the person expected to answer the call.

As can be appreciated, there are various options for setting the timer values and defining an algorithm for processing the results in order to provide the GTI signal. A collection of various timer-based values for a particular AMD algorithm is referred herein as an "AMD parameter set." Regardless of how a particular the set of AMD values is defined, and however the algorithm is defined, a given set of parameters used for a particular algorithm can be expected to provide a measurable overall accuracy.

In one embodiment, the accuracy can be measured as a percentage of audio greetings known to be from a live person, that when processed, are properly determined to be audio of a live person. Similarly, for audio greetings known to be from an AVMC, the accuracy could be expressed as the percentage of such greetings determined to be from an AVMC. It may be somewhat inaccurate to indicate a single number as a percentage of the overall accuracy without further qualification since properly determining whether a recording is from a human or machine involves analyzing error rates in both cases. Further, a high accuracy rate in detecting a live person may be unacceptable because of a low accuracy rate in detecting an AVMC, or vice versa.

Nevertheless, it is reported by some vendors that it is possible to properly ascertain that the recording of an audio greeting (referred to as an "audio snippet" herein) is from an AVMC better than 90% of the time. While this may appear to be a high accuracy rate, whenever a mistake does occur, it may adversely impact a contact center. Recall that contact centers often connect an agent when a live person is encountered and terminate the call if an AVMC is encountered. If an AVMC is mistakenly determined, when in fact, the audio is from a live person, then the contact center may be configured to terminate the call (because, the audio was deemed from an AVMC). The called person will answer the call, provide an initial greeting, which is mistaken as an AVMC, and the called party then finds out that the call is terminated because the contact center believes an AVMS has answered the call. This results in poor customer service, frustrated individuals, and may violate various state or federal regulations. To avoid this problem, contact centers may configure the equipment to err on presuming the greeting is from a person. However, if an AVMC answers the call, and the contact center mistakenly determines it to be a live person, the contact center will connect the call to an agent, who is then interacting with an AVMC. This is generally viewed as undesirable and potentially a waste of the agent's time.

As will be seen, various techniques and methods are provided for improving the overall accuracy of the AMD processing. However, first it is useful to review the context in which the principles and technologies herein operate.

Figure 2:
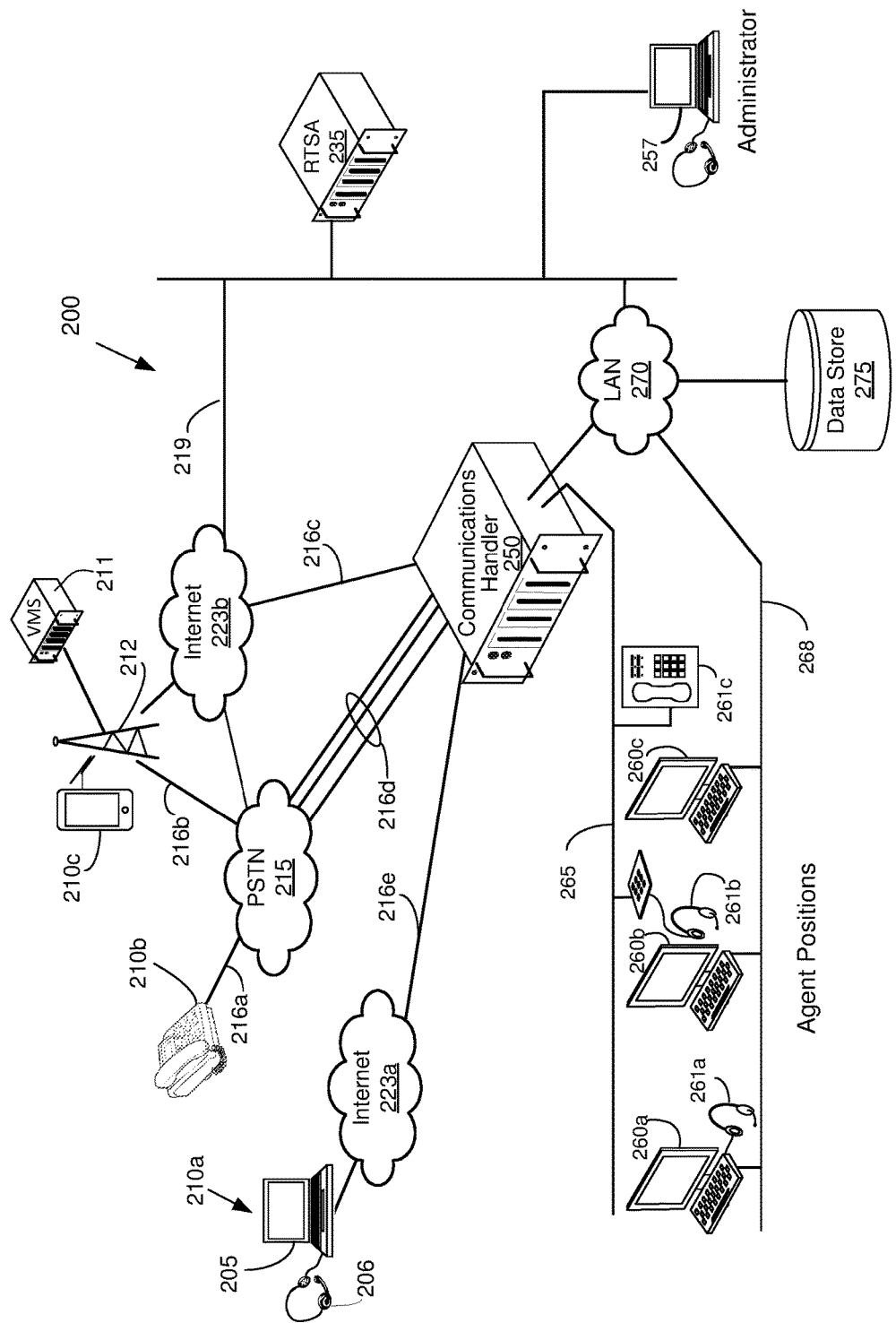
FIG. 2 illustrates one embodiment of a call center architecture for originating a call to a remote party and determining whether the greeting provided by the answering entity originated from a live person or a machine.

Exemplary Contact Center Architecture—FIG. 2

FIG. 2 illustrates one embodiment of a contact center architecture 100 that may be used in accordance with the various technologies and concepts disclosed herein. The contact center shown in FIG. 2 may process voice calls and non-voice communications that are inbound-only, outbound-only, or a combination of both (sometimes referred to as a "blended" contact center). For purposes of illustrating concepts associated with AMD processing, the illustration will focus on outgoing telephone calls.

The term "telephone call" as used herein is generally synonymous with a "voice call" unless indicated otherwise. Further, the term "telephone call" may encompass a voice call using any form of currently available technology and directed to any type of telephone device, such as a soft phone 210a, a conventional telephone 210b, a mobile phone 210c, or other device known in the art. This also encompasses various telephony oriented protocols and signaling mechanisms. The term "call" as used herein may encompass an active instance of two-way communication, an attempt to establish two-way communication, or a portion of the two-way communication.

In various embodiments, the communications handler 250 may originate a call. Specifically, the communications handler may be a dialer, such as a predictive dialer, which originates calls and connects an available agent to the call. Depending on the embodiment, outbound voice calls may originate to called parties using a variety of different phone types. For instance, a called party may receive a call at a conventional analog telephone 210b connected to a public switched telephone network ("PSTN") 215 using an analog plain old telephone service ("POTS") line 216a. The calls may be routed by the PSTN 215 and may comprise various types of facilities 216d protocols, and technologies, including, but not limited to: T1 trunks, SONET based fiber optic networks, ATM networks, etc. Various types of routers, switches, bridges, gateways, and other types of equipment may be involved in the processing of the calls.

Outbound voice calls may also originate to a mobile phone device 210c, such as a smart phone, tablet, or other mobile device, which wirelessly communicates with a mobile service provider ("MSP") 212. The voice calls may be routed to the PSTN 215 by the communications handler 250 using an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223*b* using Internet-based protocols, such as SIP or H.323 protocols. For convenience, unless indicated otherwise, the term "trunk" refers to any type of facility 216*c*, 216*d*, or 216*e* providing voice calls to, or from, the contact center, regardless of the type of protocol or technology used. Specifically, a "trunk" is not limited to time-division multiplexing ("TDM") technology, but could refer various VoIP communication channels.

Outbound calls to a called party may encounter various forms of AVMC. For example, a called party may have a telephone 210*b* that is a combination telephone and answering machine. The call, if not answered by the person using the handset, will be answered by the answering machine automatically after set number of rings. Then, a greeting may be played and the caller's message may be recorded. Similarly, a computer 210*a* functioning as a phone device may also incorporate software to perform answering machine functions. In other embodiments, a service provider, such as a mobile wireless service provider 212 may employ a voice mail system 211 in their infrastructure for forwarding unanswered calls. There, the voice mail system will play a greeting and store a message. These are all considered as examples of an AVMC.

Outbound voice calls may also originate to a calling party employing a so-called "IP phone," "VoIP phone," or "soft phone" 210*a*. In one embodiment, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such as session initiated protocol ("SIP"). The call may be conveyed by other types of Internet providers 223*a*, such as a cable company providing Internet access services over a coaxial cable facility 216*e*. Those skilled in the art will recognize that a variety of Internet Protocols ("IP") and facilities may be used to convey voice calls.

In various embodiments, outbound calls from calling parties to the contact center may originate from the communications handler 250, which could be, in one embodiment, a predictive dialer. The communications handler 250 may connect an outgoing call (or more specifically, a call leg) over contact center facilities 265 to a phone device used by an available agent. Depending on the embodiment, the facilities 265 may be any suitable technology for conveying the call, including but not limited to a local area network ("LAN") 270, wide area network ("WAN"), ISDN, or conventional TDM circuits. In addition, the facilities 265 may be the same or different from the facilities used to transport the call to the communications handler 250.

A portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. Thus, the predictive dialer may originate a call leg to a called party and join that call leg to one established with an agent's telephone, thereby forming the overall call. For example, the dialer may connect another component (such as the RTSA 235) to the call using a unidirectional call leg. This is because no audio is expected to be provided by the RTSA 235.

In various embodiments, a call leg may be routed over facilities 265 to an agent for speaking with the called party. The physical area at which the agent sits is often referred to as an agent "position" and these positions are often grouped into clusters managed by a supervisor, who may monitor calls and the agents' productivity. An agent typically uses a specially configured computing device 260*a*-260*c*, such as a computer with a display, and a voice device 261*a*-261*c* that is adapted for various contact center functions associated with processing communications. The combination of computing device 260*a*-260*c* and voice device 261*a*-261*c* may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 261*a*-261*c* at the agent's position. Similarly, "routing the call to the agent" means routing a call to the appropriate equipment at an agent's position. The workstation typically has a display, typically provided via a computer monitor. This is used to convey information to the agent about the calls, and where the agent can enter information, such as disposition information. The agent may interact with the communications handler using a mouse or other pointing device in conjunction with their computer display. Disposition information may comprise entering a code or other information indicating the outcome of a call.

In particular embodiments, the voice device 261*a*-261*c* used by an agent may be a soft phone device exemplified by a headset 261*a* connected to the computer 260*a*. The soft phone device may be a virtual telephone implemented in part by an application program executing on the computer 260*a*. Further, the phone may also comprise an Internet Protocol ("IP") based headset 261*b* or a conventional phone 261*c*. Use of the term "phone" is intended to encompass all these types of voice devices used by an agent, unless indicated otherwise.

Agents typically log onto their workstations 260*a* prior to handling calls. The workstation may also communicate this login information to the communications handler. This allows the contact center (including the communications handler) to know which agents are available for handling calls. Thus, after originating a first outbound call leg for a call, the communications handler will ascertain which of the agent is available to handle the call, and may create a second call leg to the available agent and then join the two call legs, thereby forming the call. In some embodiments where the communications handler is a predictive dialer, the predictive dialer will wait until the first outbound call leg is answered or answered by a live person, and then will immediately join the call leg to the selected agent with the call.

Depending on the embodiment, the interaction between the various components shown may involve using a local area network ("LAN") 270. However, other configurations are possible, such as, but not limited to, using a wide area network, wireless network, router, bridge, direct point-to-point links, etc. Thus, in lieu of facility 265 for conveying audio to the agents, the facilities associated with the LAN 270 may be used.

In various embodiments, the communications handler 250 is typically configured to dial a list comprising call records (and further comprising telephone numbers) to initiate outbound calls. This list, and other related information, may be maintained in the data store 275. In some embodiments, the communications handler 250 may be embodied as a modified private automatic branch exchange ("PBX" or "PABX"). Further, in other embodiments, the communications handler 250 may directly interface with voice trunks using facilities 216c, 216d, and 216e to the PSTN 215 and/or Internet providers 223a, 223b for originating calls. After the calls are originated, a transfer operation by the communications handler 250 may connect the call with an agent or place the call in a queue. In various embodiments, the communications handler 250 may make use of one or more algorithms to determine how and when to dial a list of numbers so as to minimize the likelihood of a called party being placed in a queue while maintaining target agent utilization.

The contact center may also incorporate a real-time speech analytics ("RTSA") system or component 235. This may connect to the communications handler 250 via LAN 270 or other communication means. The RTSA component 235 may be bridged onto a call by the communications handler by establishing a call leg from the communications handler to the RTSA component at any time. This allows the RTSA component to receive the audio signals of a call, and to provide analysis on the audio. This may be a unidirectional call leg, as no audio is expected from the RTSA. As will be seen, the communications handler in the form of a predictive dialer (or simply "dialer"), may originate a first call leg to the called party and simultaneously, or nearly so, originate a second call leg to the RTSA component, and joint the two. In various embodiments, the second call leg may be established when the first call leg is originated, when ringing occurs, when the call is answered, or when the call is answered by a live person. Depending on when the RTSA is joined to the call, the RTSA may receive audio signals comprising the ringing, call progress tones, or a greeting from the answering party. This is one approach for facilitating the RTSA component to aid in analyzing the nature of the greeting upon the call being answered. Thus, the RTSA component (or other component operating in conjunction with the RTSA component) may provide an indication or other data to the dialer indicating whether the greeting was provided by a person or a machine.

An administrator computer 257 may be used by the administrator to perform the configuration and administration of the RTSA component, the communications handler, the LAN, and other components in the contact center. The administrator may have access to various data structures (as discussed herein) and can configure the RTSA and communications handler to perform various types of greeting processing to ascertain whether the greeting originated from a live person or a machine.

Although a number of the above components may be referred to as a "component," each may be also referred to in the art as a "computing device," "processing system", "unit", "server", or "system" A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 250 or other component may be combined into a single hardware platform executing one or more software modules. In addition, the contact center architecture 200 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 2 represents one possible configuration of a contact center architecture 200, and that variations are possible with respect to the protocols, facilities, components, technologies, and equipment used. For example, various algorithms and queuing arrangements may be defined to efficiently process and/or place calls.

Description of Embodiments

As will become evident, there are various approaches for increasing the accuracy of AMD detection. These approaches may involve developing a more accurate set of AMD parameters that are used generally for all calls. Other approaches involve develop multiple sets of AMD parameters that are used for certain types of calls. A still more granular approach is to develop a set of AMD parameters for a call to a specific telephone number. Another approach is to replace or supplement the use of timer-based AMD detection (such as the aforementioned approaches) by using a linguistic approach of AMD detection. The linguistic approach of AMD detection may be accomplished by using a RTSA component. Hence, the timer-based approaches may be augmented (or replaced) by using a RTSA component to analyze the greeting. These approaches will become evident as explained below.

Optimization of a General Timer-Based AMD Parameter Set

Figure 3:
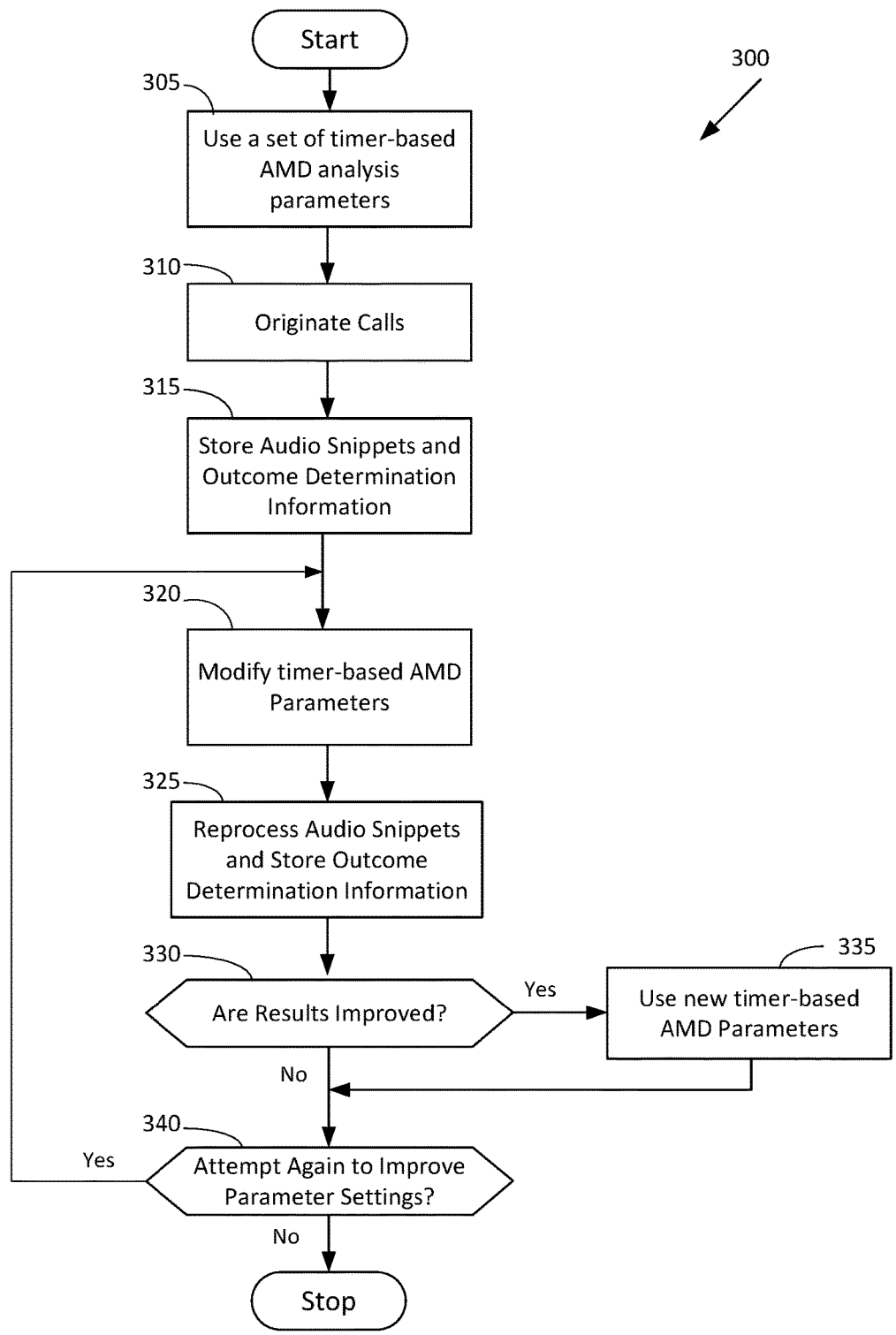
FIG. 3 illustrates one embodiment of a process flow for using a predictive model for determining various parameters to ascertain whether a greeting originated from a live person or a machine.

A first embodiment for improving the accuracy of an AMD process is shown in the process 300 illustrated in FIG. 3. This embodiment relies on using a set of AMD parameters for an existing timer-based (non-linguistic) AMD algorithm. This involves retaining a portion of the audio recordings of the call sufficient to perform the AMD analysis. (This portion comprising the greeting is called herein an "audio snippet" or the "greeting audio snippet"). The greeting audio snippets for a number of calls are collected and stored, along with information as to whether an agent disposition indicated the AMD analysis was correct or not. Alternatively, the set of greeting audio snippets can be manually reviewed by a supervisor or agent in the contact center and tagged with an indication as to whether the recording was from a live person or AVMC. Either way, a set of verified audio snippets are obtained, along with information as to the determination made by the AMD analysis, and an indication as to whether the determination made by the AMD analysis was correct or not. This allows identification of which instances the AMD analysis made a mistake classifying the audio snippet.

Next, one or more parameters of the AMD algorithm are altered, and the set of audio snippets is re-processed using the updated AMD parameter set of the AMD analysis algorithm. If the net results are deemed to be an improvement, then the new set of AMD parameters are used. This allows a sort-of "champion-challenger" test where the same set of audio snippet data is analyzed using two sets of AMD parameters or algorithms, and the parameter set having the better results are retained and used going forward. This process may be repeated as necessary, until a better model is determined.

The number of audio snippets required to provide an accurate sampling may vary. However, several thousand samples representing a suitable cross section of calls made should be sufficient. Those skilled in the art of statistical analysis can readily determine a minimum number, but there is little harm in using a too large sample size. Thus, a day's or week's duration of call recordings may be sufficient depending on the size of the set.

Turning to FIG. 3, addition details of this embodiment are illustrated. The process begins in operation 305 where a default or initial set of AMD parameters for the algorithm are used. This may involve the set of various AMD parameters discussed in regard to FIG. 1. The AMD parameter set may be loaded into a dialer or other sub-system that analyzes the greeting audio snippets in the normal course of operation. Next, the calls are originated as normal in operation 310. The number of calls necessary will vary, but can be readily determined by one skilled in the art. As part of the call origination process, the greetings will be analyzed using the AMD parameter set to determine whether the greetings originated from a live person or a machine.

What may be different from conventional operation of the contact center is that for each call, the analyzed audio recording, the classification by the AMD processing, and an indication of how the agent dispositioned the call is stored in operation 315. In situations where the AMD processing classifies the greeting as originating from a live person, then the agent will be connected to the call. If this is in error, the agent will terminate the call and indicate the outcome via a disposition code. The code should reflect that the greeting was actually provided by an answering machine. Thus, each instance of an error where the AMD processing incorrectly ascertained a live person when an AVMC was encountered should be identified and retained. The correctly ascertained audio snippets may be retained as well. Although a number of sub-operations are represented by operations 310 and 315, those should be readily identifiable to one skilled in the art.

Next, the timer-based AMD parameters are modified in operation 320. The exact parameters and their values to be altered may occur in various ways. One method may be a form of trial and error. As will be seen, there may be a number of iterations where different parameters are tested. With these modified parameters, each of the audio snippets is reprocessed by the AMD processing module in operation 325. During this operation, information as to the classification produced by the AMD processing is recorded for each audio snippet analyzed.

Once this is completed for the set of audio snippets, it is readily possible to ascertain whether the processing of the AMD algorithm using the modified parameters results in an improvement in operation 330. This can be done by tallying the number of mistakes made by the AMD processing using the new parameters and comparing it to the prior results. The AMD processing of the audio snippets with the new parameter values is likely to generate fewer or greater number of mistakes than using the old parameter values. In rare instances, the number of mistakes may be the same. Thus, the new AMD parameter set can be readily deemed to improve or worsen the results.

If the results are improved, e.g., the percentage of mistakenly attributed greeting to live person is reduced, then the set of timer-based AMD parameters used may be stored and replace the old set of timer-based AMD parameters in operation 335. To ascertain whether the results are improved, it may be necessary to also examine the number of mistakes with respect to classifying a known live person's greeting as originating from an AVMC. The new AMD parameter set may not be deemed an improvement if it reduces the errors of misclassifying an AVMC, but increases the misclassifying of audio from a live person. Regardless of how the criteria is define as an improvement in accuracy, the results can be compared between processing the audio with a new set of AMD parameter values and the old set.

Next, a determination is made whether another modification to the parameter settings will be attempted in operation 340. A parameter, such as a timer value may be altered by e.g., incrementing it 5 ms initially. Thus, the change in operation 340 may attempt to alter it again, incrementing it by e.g., another 5 ms. The process then loops back to operation 320 where the modification is made to the AMD process and the cycle repeats. This may be repeated many times, each improving the results incrementally, until no further improvement results are observed, or the results are worsened. Then it can be determined which value of the AMD parameter provides the optimal results.

The modification of the AMD parameters may not be a linear process. There are a number of variables that can modified and the amount of modification for each variable can vary. Thus, there are a large number of combinations that may be tested. However, each time the results are changed and the audio greetings are reprocessed, a quantitative measurement can be obtained as to the number of AVMC greetings that are incorrectly classifying as a live person. By performing this comparative analysis periodically, perhaps weekly, monthly, or quarterly, the contact center operator can periodically adjust their AMD parameters and be fairly confident that the AMD algorithm is operating an optimal performance or near optimal performance for most of the calls encountered.

In other embodiments, a heuristic analysis may be used to select and alter a particular AMD parameter value. This allows those skilled in the art to select parameters which they suspect are most relevant, and have the greatest potential for reducing the misclassification errors. Other algorithms can be developed based on the set of audio snippets to optimize the values in an automated manner.

Multiple AMD Parameter Sets

The prior approach defines a single AMD parameter set that is used for all calls. That is, the AMD parameter set is optimized generally for all calls. In this approach, a particular AMD parameter set is used for a subset of calls. That is, the AMD parameter set is optimized for a group of calls made, recognizing that there may be different AMD parameter sets optimized for different groups of calls. In one embodiment, there may be a single AMD module in a dialer that is loaded with a particular AMD parameter set and used processing all outbound calls of that group. Then, another AMD parameter set may be loaded when dialing another group of numbers. In other embodiments, there may be multiple dialers used, and each can have a slightly different set of AMD parameters in the AMD processing module and each dialer is dialing a separate group of calls. This approach is based on knowing, a priori, that calls to certain sub-sets of calling records in a calling list will have different characteristics.

For example, a calling list of telephone numbers may be sorted into two groups of records. Those records of telephone numbers associated with a certain geography may be in a first group whereas records associated with another geography may be in a second group. One basis may be to segregate the records based on whether the called party is in an urban or rural area. Another basis may be to segregate the records based on region of the country (e.g., states north of the Mason-Dixon line or states south of the Mason Dixon line). The reasoning is that individuals in these regions may speak at a different speed, accent or have a different cadence, and this may also be reflected in their AVMC greeting. Then, each calling list is loaded onto a corresponding dialer, which originates calls to that particular region, and each dialer incorporates the AMD module with an optimized AMD parameter set.

Figure 4:
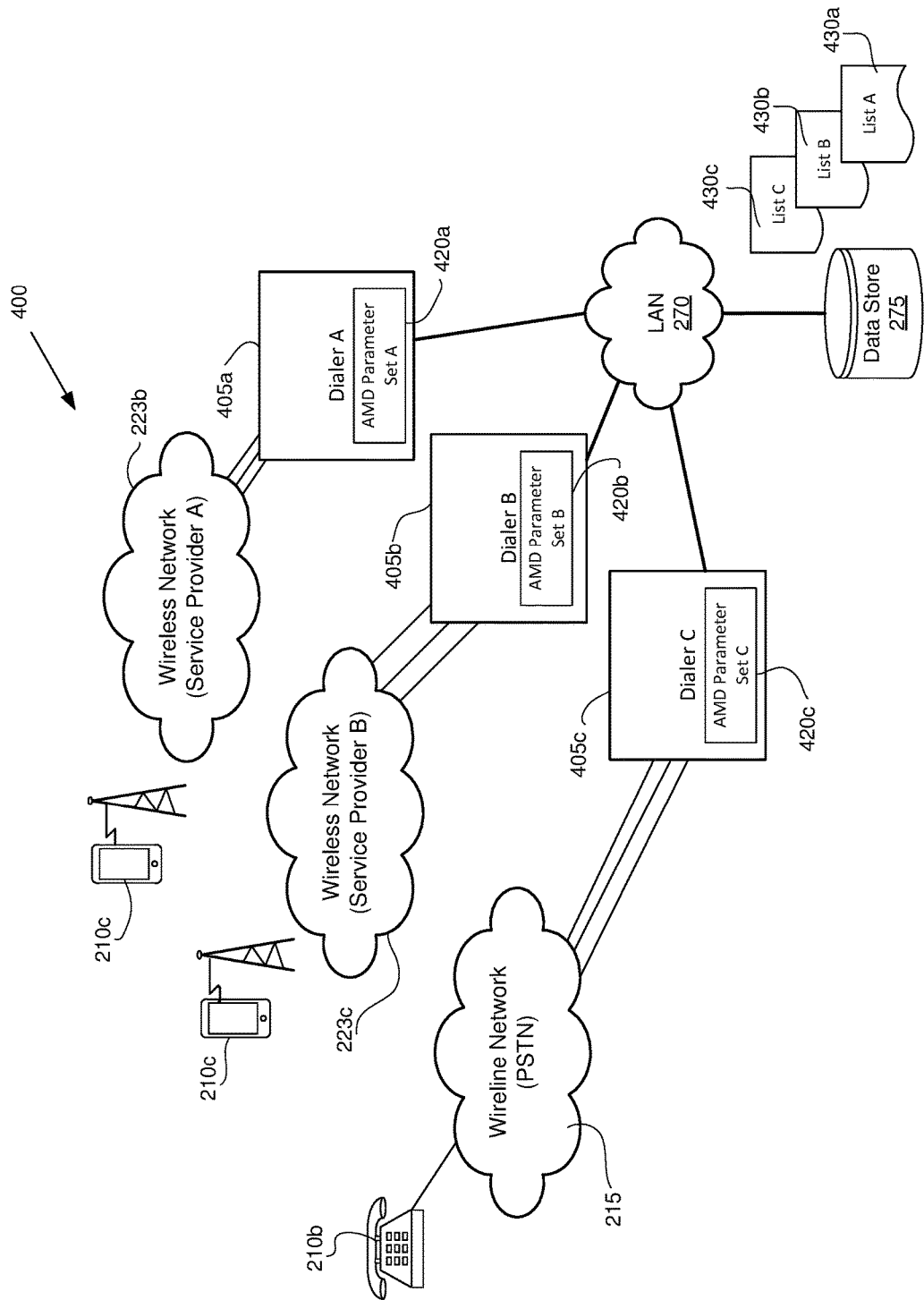
FIG. 4 illustrates one embodiment of an architecture for using various AMD parameters sets optimized for certain situations to ascertain whether a greeting originated from a live person or a machine.

Another example is shown in FIG. 4. In this figure, which is based in part on FIG. 2, the data store 275 stores three calling lists, List A 430a, List B 430b, and List C 430c. In this embodiment, List A wireless numbers associated with Service Provider A 223b. List B comprises wireless (cellular) numbers associated with Service Provider B 223b. List C comprises wireline numbers associated with the wireline network 215. The particular wireless carrier can be readily determined from available service providers that will "scrub" a list of calling numbers and identify which are wireless numbers. These services will also indicate which wireless carrier the number is associated with. Since most wireless subscribers are associated with one of the main four wireless carriers, the number of carriers indicated is limited. Such number scrubbing services are readily available to contact center operations in order facilitate compliance with Telephone Consumer Protection Act ("TCPA") regulations.

Each list is provided to a corresponding dialer 405a, 405b, and 405c via LAN 270. Furthermore, each dialer has a corresponding unique set of AMD parameters. Consequently, dialer A 405a will have its unique AMD parameter Set A 420a, and so forth for dialer B and dialer C. Thus, when each call is originated by the dialer, it will use an optimized set of AMD parameters to ascertain whether the greeting encountered is from a live person or an AVMC.

The reason this may work for wireless carriers is that each wireless carrier provides voice mail service to its subscribers (typically, there is no answering machine equipment owned and operated by the wireless subscriber, as may be the case for wireline service). Each wireless carrier typically may have a slightly different, but typically uniform, default greeting on their respective AVMC. If the subscriber has not created a customer greeting, or is not allowed to do so, then a default or semi-custom greeting is provided, which will have a certain syntax and cadence. In some instances, the wireless carrier may incorporate unique tones or sounds.

For example, some wireless carriers may provide a voice mail greeting as follows: "Your call to number "4-0-4-5-5-5-1-2-1-2" has been forwarded to a voice mail service. Please record your message after the tone." This has a common cadence and structure, although the particular announced called number is different, from subscriber to subscriber. It may be possible to optimize the AMD parameter values to detect a default or semi-custom greeting for those carriers. If so, the accuracy may be increased compared to using the same AMD parameter set for all carriers. Typically, the identification of a series of numbers (characterized by pauses) is strongly suggestive of a machine provided greeting.

The determination of the set of AMD parameter values for a particular carrier may be obtained as was discussed previously for FIG. 3, except that the audio greeting that are recorded and analyzed are from a single carrier. Thus, it is possible to develop an AMD parameter set optimized for a particular wireless carrier.

Figure 5:
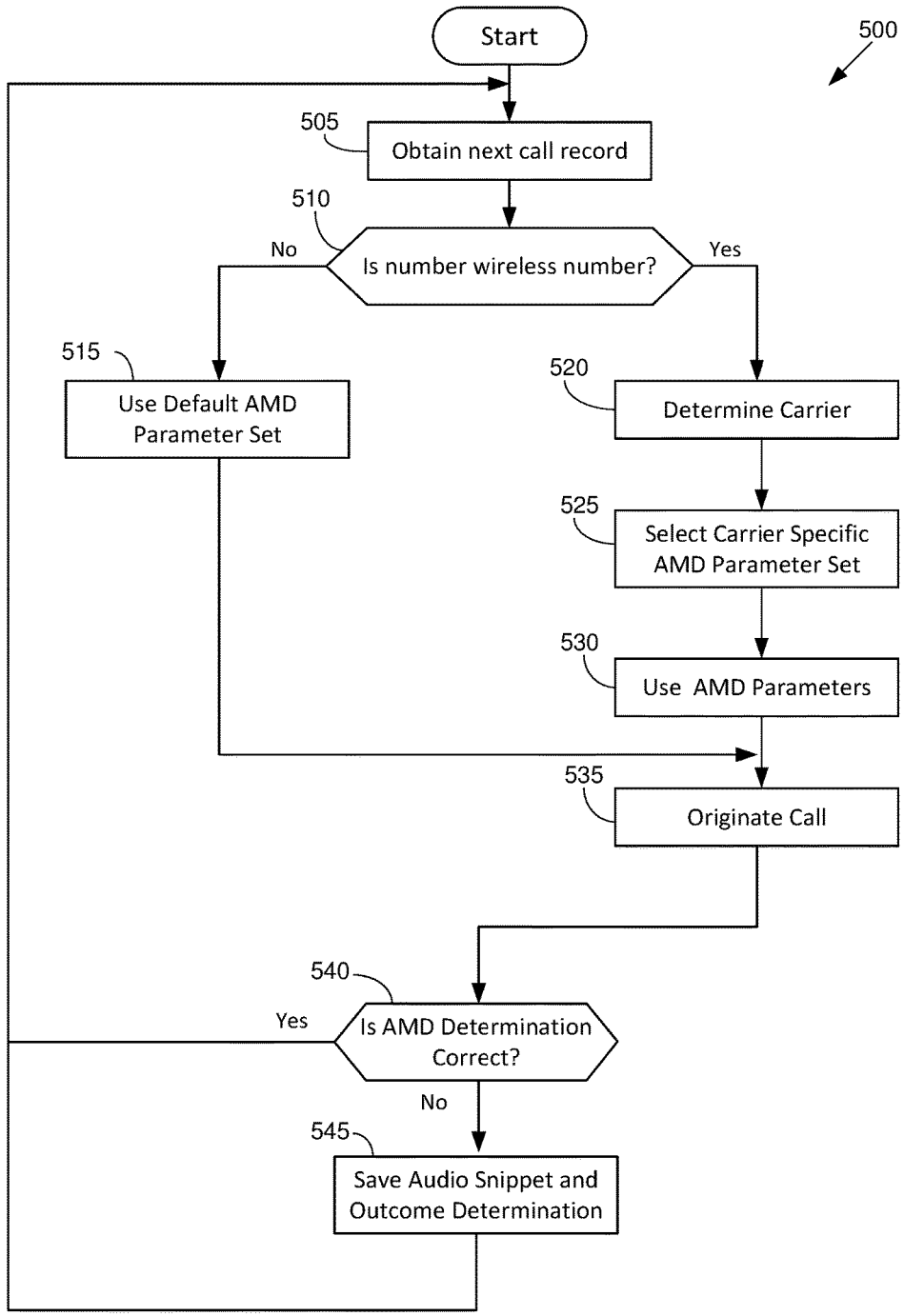
FIG. 5 illustrates one embodiment of a process flow for using various AMD parameters sets optimized for certain situations to ascertain whether a greeting originated from a live person or a machine.

An embodiment of a process flow that utilizes different AMD parameter sets for wireless carriers is shown in FIG. 5. Turning to FIG. 5, the process 500 begins with retrieving the next call record in operation 505. A determination is made whether the number is a wireless number in operation 510. If it is not, then a default AMD parameter set may be used in operation 515. The call is then originated in operation 535. Based on the agent's disposition of the call, a determination can be made in operation 540 as to whether the AMD determination was correct or not. If it is not correct, then the audio snippet is stored along with the outcome (and other information) in operation 545. The purpose is to retain the necessary information about the errors to potentially improve the AMD parameter set values.

If the number is a wireless number in operation 510, the wireless carrier is determined in operation 520 and the corresponding AMD parameter set developed for that wireless carrier is selected in operation 525. That particular AMD parameter set is then selected and used by the AMD processing module in operation 530 and the call is originated in operation 535. Again, if the AMD determination is incorrect in operation 540, the information is retained for subsequent analysis in operation 545. This allows the AMD parameter set for each carrier to be maintained with optimized values.

AMD Parameter Optimization for a Specific Telephone Number

The above discussion illustrates how an optimized AMD parameter set can be determined for a particular type or group of calls. By limiting the population to, e.g., calls to a certain carrier or demographic region, a more customized AMD parameter set can be created to optimized AMD determination for a subset of the calls. Taken to its extreme, the AMD parameter set can be optimized for a particular telephone number. In essence, the AMD parameter set is optimized or tuned to a particular greeting of an AVMC from a particular telephone number. The AMD parameter set can be generated in response to encountering a mistake in classifying a particular greeting from an AVMC, and applied when calling that telephone number at a subsequent time.

Since contact centers are motivated to properly classify a greeting, and contact centers maintain various information on each account they are attempting to contact, the AMD parameter set for a telephone number can be stored in that account's profile in the calling list or another file. The account profile contains information unique to that account, including various telephone numbers used to reach that account. The call record may include other information as to whether each number in the account is a wireless or wireline number, etc. So, it would not be unusual to store further information (or provide a link to) about a particular set of AMD parameters that should be used when calling a particular telephone number.

This requires that the dialer allow dynamic reconfiguration of the AMD parameter values on a per-call basis. Specifically, the AMD parameter values are configurable on a call-by-call basis. As each call record is retrieved and read, the associated AMD parameter set is read and provided to the dialer (or other entity performing the AMD analysis) to configure the AMD processing accordingly. This allows the AMD parameter set to be customized, indeed optimized, for each particular AVMC greeting that may be encountered.

Figure 6:
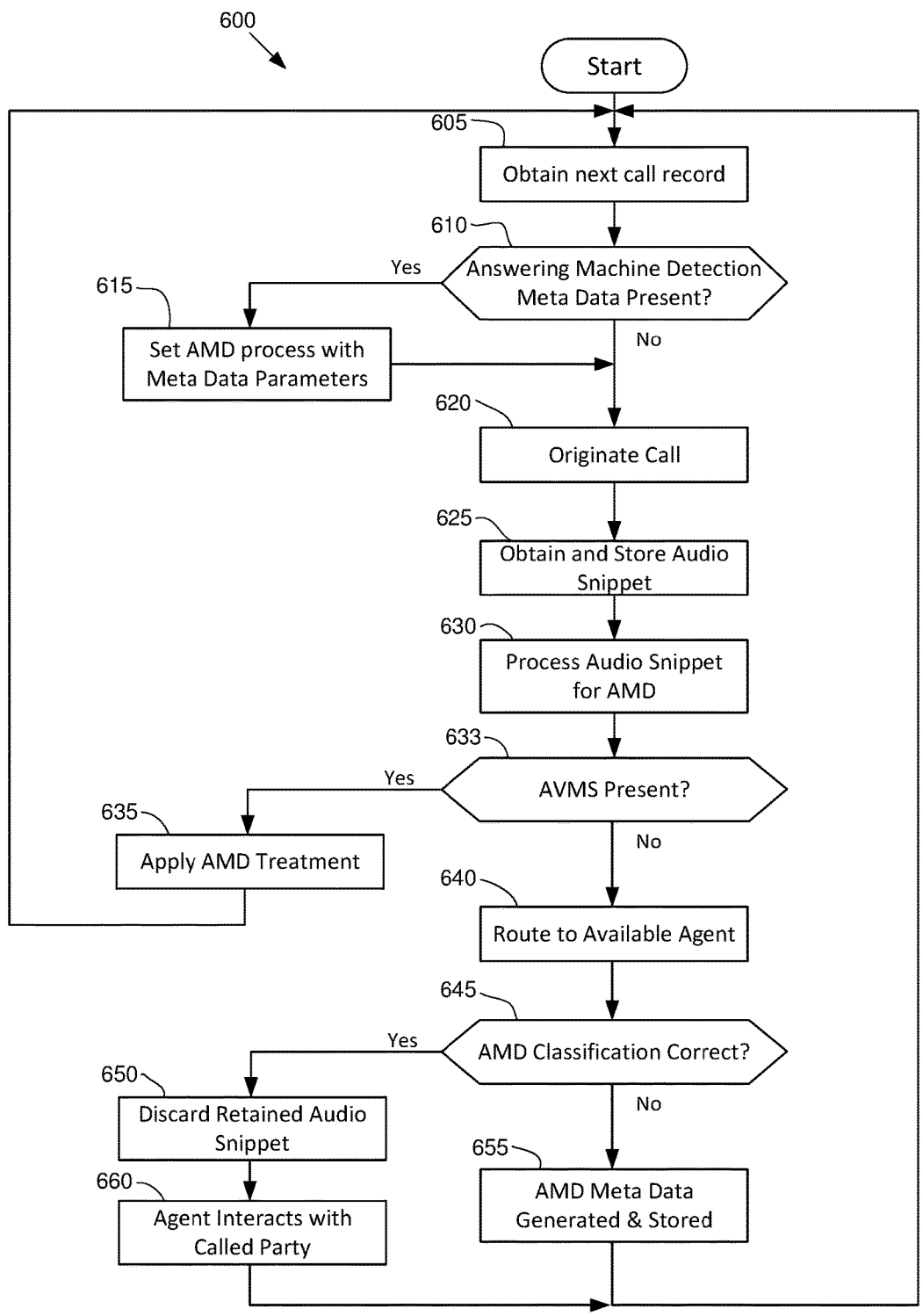
FIG. 6 illustrates one embodiment of a process flow for using and determining AMD parameters for a particular outbound call to ascertain whether a greeting originated from a live person or a machine.

An overview of the process is illustrated in FIG. 6. Turning to FIG. 6, the process 600 involves the dialer obtaining a next (or first call record, if it is the first pass through the process 600) in operation 605. This information will comprise the telephone number to dial and it may also comprise information about the relevant AMD parameters set for that telephone number. If it is determined that AMD parameters are present in operation 610, then those parameters are used to configure or set the values in the AMD process in operation 615. If the AMD parameters are not present in operation 610, then the existing AMD parameter set values may be used.

In either case, the process proceeds to originate the call to the number indicated in the call record in operation 620. Assuming the call is answered, the audio greeting is then received and stored in cache in operation 625. The audio greeting or audio snippet is processed using the AMD parameter set presently loaded (whether the default or custom version) to determine whether the greeting is a live person or machine in operation 630. Next, a decision branch occurs in operation 633 based on whether an AVMC is present or not. If an AVMC (i.e., machine) is determined to be present, then the configured AMD treatment is provided in operation 635. This may include terminating the call or playing an announcement after the greeting is completed. The process then loops to process the next call record in operation 605. If an AVMC is not present in operation 633, then this indicates that a live person is detected. The call is routed (or connected) to an agent in operation 640.

At this point, the agent will ascertain whether the speech they are hearing is, in fact, a live person or not. If the agent determines the AMD classification is correct (e.g., it is a live person) in operation 645, then the audio snippet that was retained in cache can discarded in operation 650. The agent may then normally converse with the live person in operation 660. Once the call is completed (not shown), the process loops back to operation 605 to process the next call record.

However, if the agent determines that a misclassification occurred in operation 645, namely that the agent is hearing a greeting form an AVMC, then the agent will disposition the call (not shown). This indicates to the dialer that the call was incorrectly classified as a live person, as opposed to an AVMC. The dialer will then use the stored audio snippet and process it in operation 655 to generate custom AMD parameters. The AMD parameters are then stored with the account information in the call record or other system, so that it can be used on a subsequent call to that number.

Figure 7:
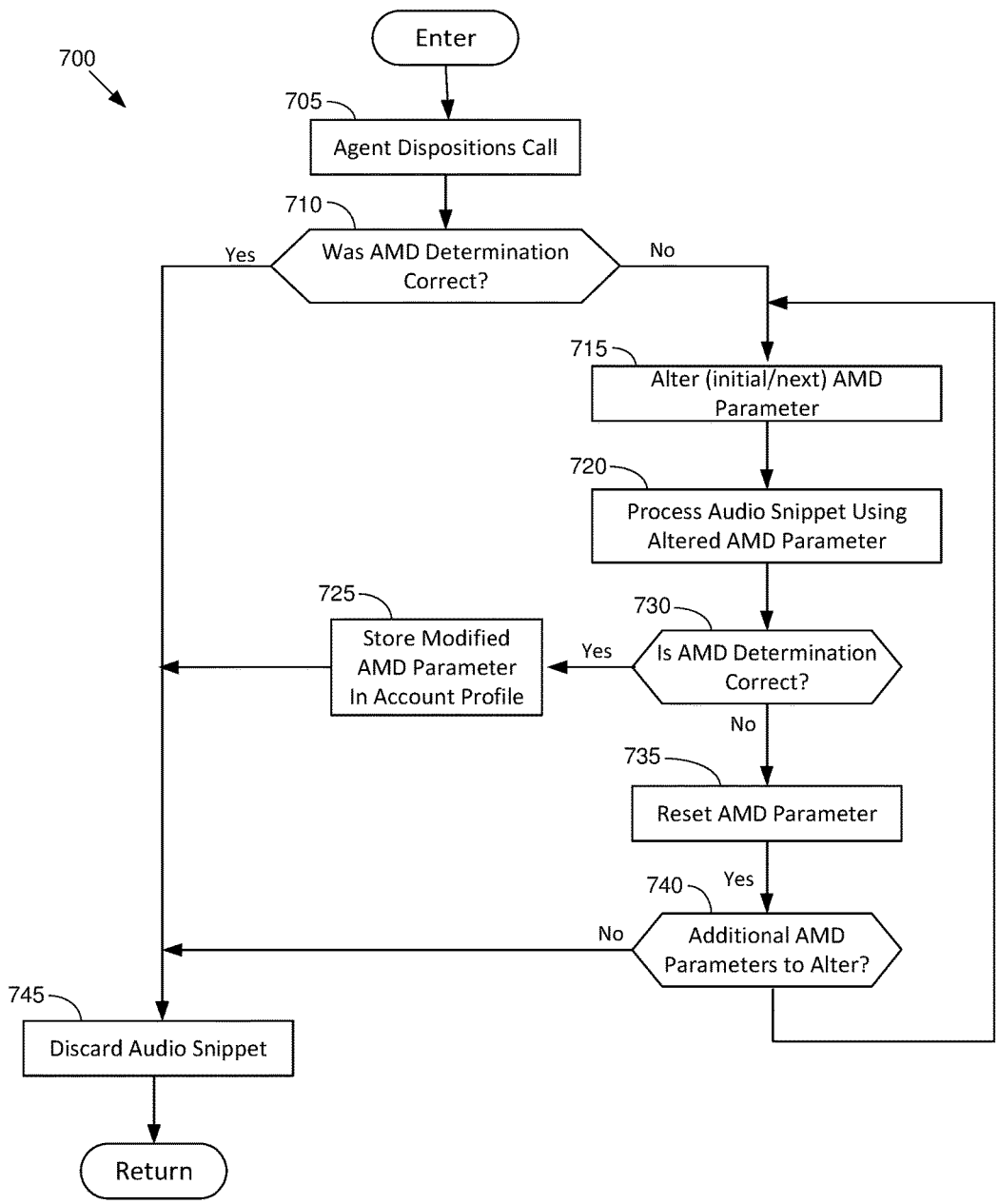
FIG. 7 illustrates one embodiment of a process flow modifying an AMD parameter to improve the determination of whether a greeting originated from a live person or a machine for subsequent calls to a particular telephone number.

The operations that occur in conjunction with operation 655 of FIG. 6 are shown in greater detail in FIG. 7. The process 700 in FIG. 7 begins with the agent dispositioning the call in operation 705. Recall that the agent was connected to the call because the dialer received an indication from the AMD processing module that the audio greeting was from a live person. If the disposition code indicates that this determination was correct in operation 710, then the audio snippet can be discarded in operation 745 and the call completes as normal.

However, if the disposition code indicates the AMD determination was incorrect in operation 710, then in this embodiment, the process continues by altering one of the AMD parameter values in operation 715. This may involve increasing or decreasing one of the timer values of a particular AMD parameter. Next, the audio snippet, which has been cached, is reprocessed using the updated AMD parameter value in operation 720. If this results in providing a correct greeting type indication, namely that the audio snippet is from an AVMC, then the process continues to operation 725 where that updated AMD parameter is stored as AMD meta-data in the account profile.

If, however, the AMD reprocessing of the audio snippet still results in an error, namely that a live person is determined, then that AMD parameter is reset to its original value in operation 735, and a determination is made whether to modify another parameter is operation 740. If so, then the process loops back to operation 715 where either that same parameter is varied again, or another parameter is selected, and the audio snippet is reprocessed again using the new values. The process may loop any number of times to keep changing parameter values to see if the correct outcome can be generated. If the correct outcome is generated in operation 730, that updated AMD value will be stored in operation 725 and used on subsequent calls to that number. Thus, when that greeting in encountered subsequently, it should be processed correctly. The test in operation 740 ensures that a limited number of attempts are made.

The process shown operation 715-740 loops to determine an AMD parameter value that produces a correct outcome. This process may occur "off-line." That is, the dialer may retrieve a record, place the call, ascertain from the disposition code that the AMD determination was incorrect, and simply store the audio snippet in a file for later processing. This later processing could be after the calling list is completed. Thus, the processing of the greeting may occur at "off hours." If so, then the process shown in operations 715-740 could retrieve each audio snippet, alter the AMD parameters, and test to see if it produces a correct result. In this manner, the processing would not consume computing cycles which may be required during the call origination processing.

In addition, the determination of which AMD parameter to alter in 715 may occur in various ways. One way, based on experience, may be to define a particular list of parameters to modify in the order specified. The list may also indicate how much to alter each parameter. For example, some parameters may have a timer value incremented, while others may be decremented. Some may be incremented in discrete units (e.g., 1 ms at a time). Others may increment in other units, e.g., in steps of 25 ms. For example, the first AMD parameter to be modified could increment the initial silence detection period by 5 ms. The second AMD parameter to be modified could increment the minimum audio level for a message by 50 units. The third AMD parameter to be modified may decrement the minimum word duration by 3 ms. In other embodiments, only a single parameter may be modified, such as the duration of the audio analyzed. If the various desired parameter modification does not produce the correct result, then the process may stop and not attempt any other modifications. Of course, multiple parameters could also be modified at the same time. If a correct classification cannot be obtained in the desired time, such a situation may require further manual investigation. Thus, there is great flexibility as to how and which parameters are modified.

Figure 8:
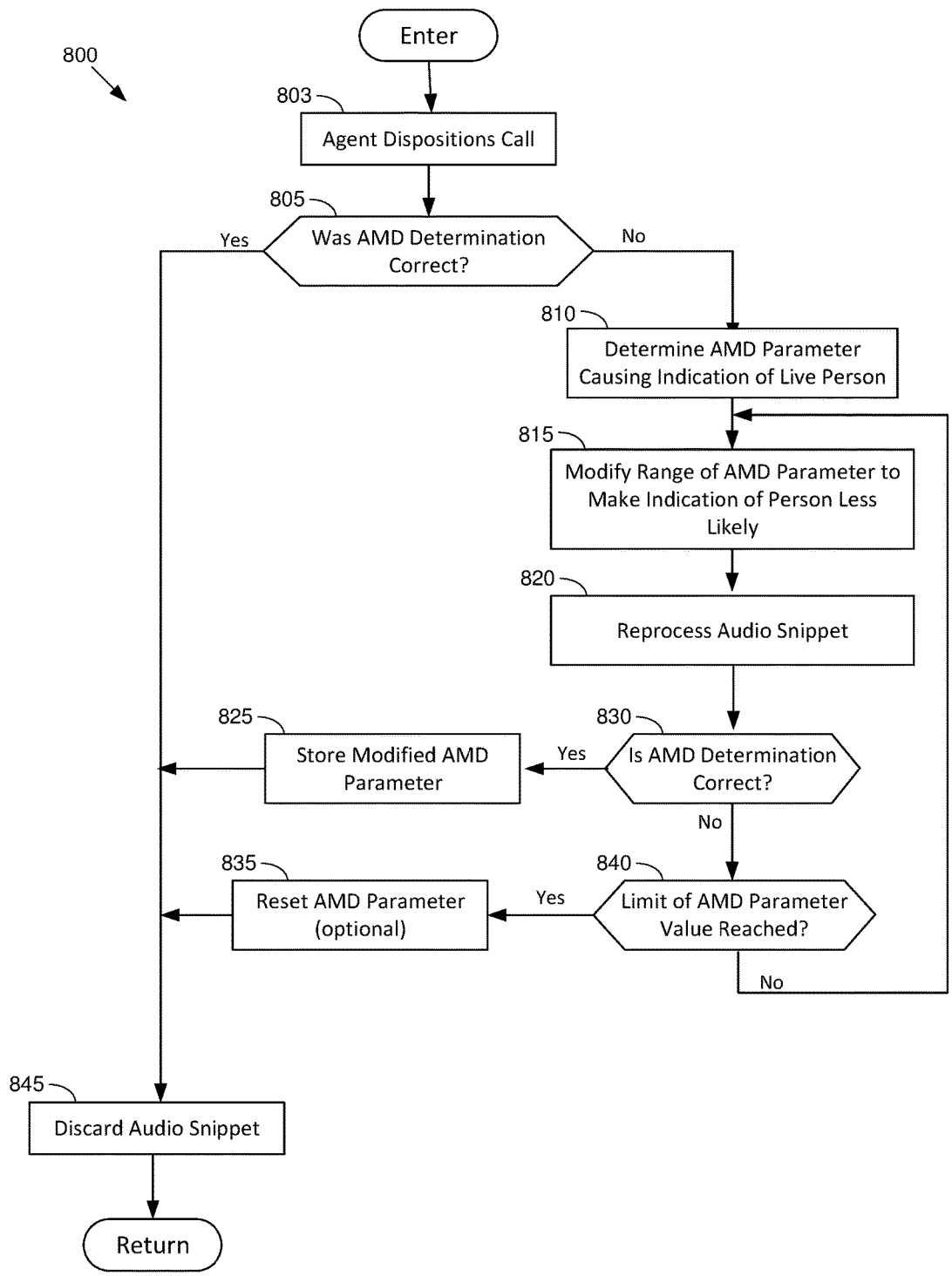
FIG. 8 illustrates another embodiment of a process flow modifying an AMD parameter to improve the determination of whether a greeting originated from a live person or a machine for subsequent calls to a particular telephone number.

Another approach for modifying the AMD parameters is shown in FIG. 8. Turning to FIG. 8, the process 800 is similar in some respect to FIG. 7. The process 800 begins with the agent dispositioning the call in operation 803. If the disposition code reflects a correct AMD determination, then the process continues to operation 845 where the audio snippet can be discarded.

If, however, the disposition code is determined in operation 805 to reflect an incorrect AMD determination, then the process determines which of the AMD parameters triggered the determination that the greeting was a live person in operation 810. It is this particular parameter(s) which is then modified in operation 815 to make the indication of a live person less likely. That modified value is then used to re-process the audio snippet in operation 820. If the AMD determination is correct in operation 830, then the modified parameter is stored in the account profile as AMD meta-data in operation 825. If the modification does not result in a correct determination in operation 830, then a test is made to see whether the modification of that particular AMD parameter has reached a limit in operation 840. If so, then the AMD parameter is reset in operation 835. Thus, no changes to the AMD parameters are made if a correct result cannot be obtained. If, however, additional modifications to that parameter range can occur in operation 840, then the process loops back to operation 815 where another change is made and the process repeats.

This embodiment reflects that sometimes a single parameter may be causing the incorrect determination of a live person in the greeting, and that gradual incremental or decremental changes to a single parameter timer value are required. This process may be faster and/or may allow better "fine tuning" as opposed to merely setting that parameter to its maximum or minimum value. For example, in some embodiments, the detection of four or more words indicates that the greeting is likely to be an answering machine. In most cases, individuals leaving a greeting on an AVMC use more than four words. However, some individuals may leave a very short greeting, such as "Leave a Message" or "Not here" (meaning "I am not here"). In these cases, the presence of less than four words may be encountered and is indicative of a machine. Thus, this embodiment allows tailoring of the default AMD parameters that may then be used when calling a particular telephone number to obtain a more accurate greeting type determination.

Use of an RTSA Component

The above describes AMD applications based on technology that distinguishes between the detection of audio and silence as defined by a set of AMD parameters (i.e., timer-based parameter values). This technology is based on the detection of audio signals, which is presumed to be a surrogate of the presence of voice. Typically, audio signals above a threshold and longer than a minimum duration are detected and are presumed to be voice, as opposed to noise. Such an approach can be readily accomplished on analog or digital signals. However, when noise is above a certain level and longer than a minimum duration, it will be interpreted as voice and can lead to an error in classification. Thus, the mechanisms for distinguishing between voice and background noise based on exceeding a threshold or duration are not always effective.

Another approach involves a more sophisticated analysis, namely the use of a real-time speech analytics ("RTSA") component or system. A RTSA system has the ability to perform a more nuanced approach, which is based on more sophisticated analysis algorithms. This is not merely based on a volume and timing level, but which may be on a speech or linguistic level. The RTSA is able to analyze the greeting to develop a set of data characterizing that greeting. This set of data is referred to herein as "AMD meta-data." The AMD meta-data is ideally unique to a particular instance of a greeting, such that it can be used to ascertain whether a subsequent instance of that greeting is the same a first instance or is a different greeting. It is not the same as the AMD parameter set previously identified, which is a set of timer parameters for an algorithm used to detect whether a greeting is provided from a machine. Although AMD meta-data may be time based, it is not a set of timers as is the AMD parameter set.

Figure 9:
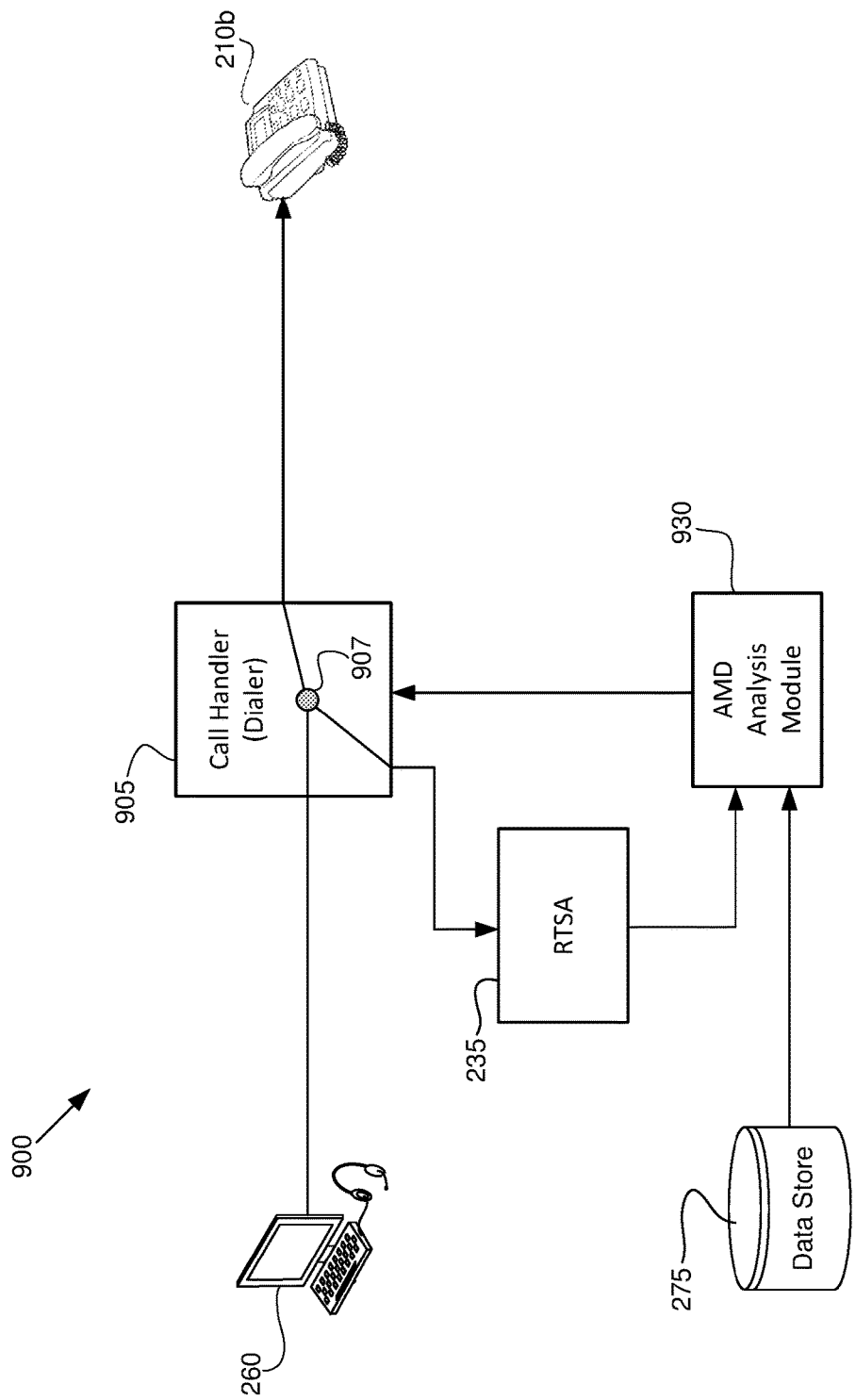
FIG. 9 illustrates one embodiment of an architecture for using a Real Time Speech Analytics ("RTSA") component to improve the determination of whether a greeting originated from a live person or a machine.

One embodiment of such a system that may be used in a contact center is shown in FIG. 9. Turning to FIG. 9, the system 900 includes some of the elements shown in FIG. 2, but emphasizing only the more relevant components for this approach. Starting with the call handler 905 first, this component is a type of communications handler that handles voice calls, and more specifically, may be a dialer of some form that originates calls. The calls are originated using various telephony technologies (not shown) to a called party, represented by the telephone 210b. In various cases, the answering entity may be a person or a machine which in the latter case may be in the form of an answering machine or a voice mail service. Thus, outbound call leg from the dialer to the called party is conceptually illustrated as being attached to a conference bridge 907. This allows copies of the audio signals from the answering entity to be provided to other components, such as the RTSA component.

In FIG. 9, the audio from the answering entity is provided to an RTSA component 235. The RTSA 235 may be referred to herein as a standalone system or a component but in either case, it operates in conjunction with the other components. The functionality of the RTSA 235 may be integrated into the call handler 905 or may be deployed as a separate component, interfacing via a LAN in close cooperation and communication as needed. In one embodiment, the RTSA component 235 will receive from the call handler 905 the audio greeting from the answering entity and perform analysis that is used to determine if the audio is voice, and whether it originated from a live person or a machine.

The RTSA component 235 provides data regarding the analysis to the AMD analysis module 930. In various embodiments, the AMD analysis module 930 takes data from the RTSA and may supplement this with data from a data store 275 to make the determination of whether the audio is speech, and if so, whether it is from a live person or a machine. In various embodiments, the functionality of the AMD analysis module may be incorporated into the RTSA component 235 or the call handler 907. In other cases, the AMD analysis module is executing in a separate processing system that interfaces with the RTSA component 235. In some embodiments, the RTSA component 235 may provide data and/or a preliminary determination which the AMD analysis module uses to generate a greeting type indication signal back to the call handler 907, which then takes appropriate action. Specifically, if the audio is determined to be from a live person, then a call leg to the agent, represented by the line to the agent's computer 260, is established by the call handler. If the audio is determined to be from a machine, then the call leg to the agent is not established, and the call leg to the called party may be terminated by the call handler.

In various embodiments, the RTSA component can be used to further "learn" about instances where the audio is incorrectly determined as being provided by a live person. Recall that in such cases where a live person is thought to be present that the call leg to the agent will be established. In one embodiment, if the audio is determined to be from a machine based on agent input, the call handler can instruct the RTSA component and/or the AMD analysis module to "learn" from this mistake. In other embodiments, the update information specific to this audio greeting may be stored in the data store 275 (either by the RTSA component or the AMD analysis module), This can be used in analyzing audio when a subsequent call is made to the telephone number of the called party. In that way, the likelihood of future errors may be decreased.

Thus, on a subsequent call to that same telephone number, the RTSA component will again analyze the audio. The RTSA component may analyze the audio in a number of different ways and provide the analysis to the AMD analysis module. The AMD analysis module may further use information previously obtained and stored in the data store 275. The AMD analysis module can then more accurately confirm whether the greeting of the present call is from a machine or not. As will be seen, the analysis involves determining whether the audio received from a called party at a given telephone number is essentially the same audio from that same telephone number that is determined earlier to be from a machine. The analysis shares some common aspects of comparing two samples of audio to ascertain if they are the same.

Figure 10:
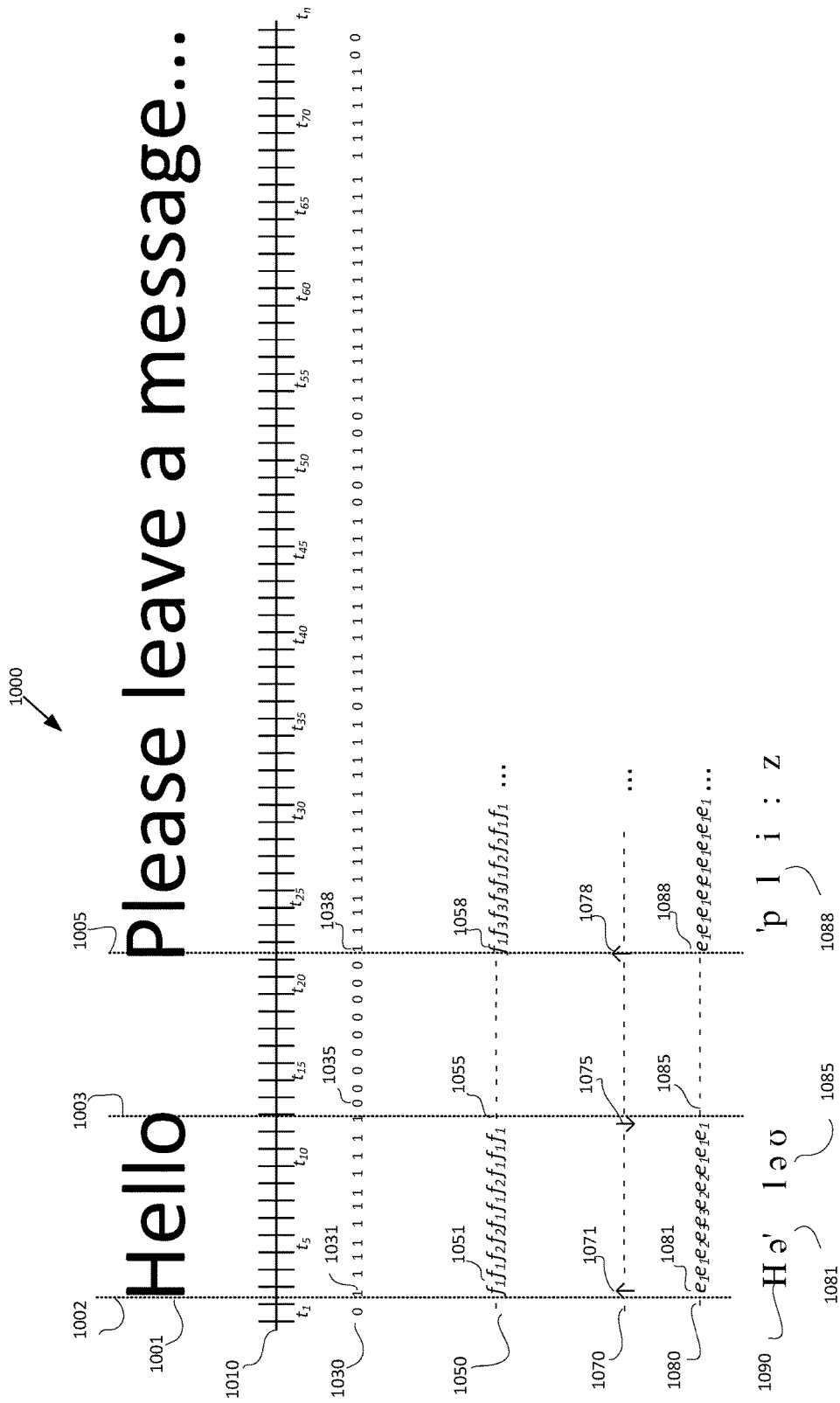
FIG. 10 illustrates various embodiments for obtaining AMD meta-data of a greeting determined to be from a machine.

The analysis by the RTSA component characterizing a greeting can be made in different ways and is referred to as "AMD meta-data". Various approaches are illustrated in FIG. 10. It should be evident that FIG. 10 represents only a subset of the various approaches that could be used in characterizing audio that has been determined to be a greeting from a machine. The process 1000 involves deriving AMD meta-data that characterizes the audio greeting in some way, which can be subsequent used to facilitate a comparison.

The approaches shown in FIG. 10 are based on performing a variety of audio analysis on the speech in a relative short time period. In the example of FIG. 10, a time line 1010 is shown which, for sake of illustration purposes, has time period defined e.g., 10 time periods per second, or a duration of 100 milliseconds ("ms"). In practice, this time period could be much shorter, such as 1 millisecond, or 5 ms. Generally speaking, the shorter the interval, the more accurate or descriptive the results will be, but more data and analysis is required. However, showing a 1 ms time period means that the scale of the drawing would have to be very large. For purposes of demonstrating the concepts and principles, this illustrative time scale is sufficient.

The phrase 1001 analyzed here is, e.g., "Hello. Please leave a message after the beep." (The phrase shown on FIG. 10, however, does not indicate the periods, which are included here.) Other phrases could be used to illustrate the concepts. Because of size limitations on the drawing, only a portion of the phrase is shown. Again, this scale it is sufficient to illustrate the concepts of developing AMD meta-data of the audio greeting.

It should be noted that various vertical reference lines 1002, 1003, and 1005 are shown. These are provided as reference lines showing when the speech either begins or ends. Thus, the first line 1002 reflects the beginning of the word "hello" and the second line 1003 reflects the end of that word. Similarly, the third line 1005 reflects audio beginning with the word "please". Only three such lines are shown, which are sufficient to illustrate the concepts for characterizing the speech.

The time periods are marked as e.g. $t_5$ on the timeline 1010 for reference. Every fifth value is marked, such as $t_5$, $t_{10}$, etc. In this embodiment, it can be observed that the first reference line 1002 occurs during the second time period, $t_2$ (not labeled). This reflects that a slight delay was recorded on the greeting by the machine. Although FIG. 10 shows the delay as approximately 1.5 time periods, in practice the delay may be more or less. Further, the number of time periods depends on the level of resolution of each time period.

Binary AMD Meta-Data Mapping

In the first approach, represented by row 1030, a series of binary values, comprising either a "0" or a "1" are stored in a memory map as AMD meta-data representing the analysis of the greeting. The determination of a "0" represents audio below a threshold (e.g., essentially silence) and a value of "1" represents audio above a threshold (e.g., essentially speech). In the example shown, the first value is "0" for $t_1$ since this represents the initial silence. The next time period $t_2$ is a "1" 1031 which represents speech associated with the letter "h" from the word "hello." The values continue as "1" until $t_{12}$ which is then followed by a "0" 1035 at the end of the word "hello." The following values represent the silence between the words "hello" and "please." The remainder of the pattern of "0s" and "1s" can be seen as correlating to when voice is detected and when it is not.

The example shown is simplified, as there very well may be, in fact, periods of silence detected at later times, of a greater or lesser degree. This again depends on the scale of the time periods. Further, the threshold value at which a "1" is determined versus a "0" may alter the resulting pattern. What is evident is that a series of "1" and "0" are produced that are unique for this message. This set of binary numbers can be stored in a memory map as a numerical value. In this example, where there are 10 samples per second, data for say, e.g., 5 seconds, would require 50 samples. Since each sample is one bit, and there are 8 bits in a byte, the sample of 50 bits would only require slightly more than 6 bytes of memory.

Because each bit represents the presence of speech in the greeting at a particular time, it is quite unlikely that a person answering the call and providing a greeting would closely match the AMD meta-data determined for that machine provided greeting. In this manner, a simple binary comparison of a binary AMD meta-data of the speech could be used to determine if the greeting encountered is that previously determined to be from a machine. If not, then it is assumed to be from a live person. If the same greeting is encountered on a subsequent call, then a binary AMD meta-data mapping would produce very similar, if not the exact same results. Since many individuals do not frequently alter their AVMC greeting, it is quite likely that a close match of a subsequent greeting can be made with a previously analyzed greeting.

It could be argued that this type of analysis is actually not based on a linguistic analysis, but is more similar to mapping detected time periods of silence and non-silence. However, because this analysis is similar in structure as to the other methods discussed below, it is referred to herein as a linguistic-based analysis.

Frequency AMD Meta-Data Mapping

Another approach is represented in the second row 1050 shown in FIG. 10. This approach is based on performing a frequency analysis of the dominate, fundamental, or some other type of frequency present in the audio. This can be performed using various techniques known to those skilled in the art, from spectral analysis or various digital signal processing methods. In this approach, frequency information is stored for each time period of the duration of analysis of the audio greeting. Since the first time period $t_1$ is silence, the value is null, represented by a "-". The second time period shows that a frequency of $f_1$ 1051 was detected. This is followed by the same frequency until the fourth time period, where $f_2$ is detected and recorded. Then, it may return to $f_1$ 1055. The various frequency values represented by $f_1$ and $f_2$ are representative of an analysis, and other frequency values could be obtained. During the silence period between the second reference line 1003 and the second reference line 1005, the values are represented by a series of "-" until the next frequency 1058 is detected. In this way, the series of values recorded represent a map of the frequencies.

The value of each frequency may require a number of bits to represent. Assuming, for example, that one byte of memory is required to store a corresponding binary value, then 10 bytes are required per second of analysis. If a maximum time of, e.g., 5 seconds are analyzed and stored, then the total memory storage required would only be 50 bytes. Of course, the higher resolution required requires a greater the number of bytes to be stored. Further, the time period of the greeting to be analyzed may vary, but this example illustrates that mapping requires less data than would be required in storing the audio itself.

Although this is based on analyzing the speech to determine a predominate frequency, other forms of speech analysis can be performed and recorded for each of these time intervals. Although various forms of frequency analysis may be performed, it is still considered AMD meta-data as it is performed with respect to various time periods.

Word Timing AMD Meta-Data Mapping

Another approach is represented by the next row 1070 in FIG. 10. In this case, the up-arrow symbol 1071 and the down-arrow symbol 1075 are used to represent the transition of energy levels in the speech, or alternatively, the beginning and ending of a word. Specifically, a transition from relative silence to speech is represented by an up-arrow 1071. In this first instance, this represents the initial speech from the word "hello." The transition from speech to silence is represented by a down-arrow. Thus, when the word "hello" is completed, the down-arrow 1075 is recorded. When the next word "please" is initial spoken, the next up-arrow 1078 is detected and recorded. A null system "-" is shown between the two symbols. The process continues, although not shown in its entirety in FIG. 10.

The threshold of what constitutes silence and speech may be set at various levels. By adjusting the level up, the markers are not necessarily determined at the very beginning or ending of a word, but only when the energy level crosses a threshold when speaking or ending a word. Regardless of the actual threshold level, a mapping of the word timing or audio energy is produced. Again, this timing would be expected to match the word timing of the same greeting if subsequently encountered on a subsequent call to that telephone number. It is unlikely that the same mapping would be detected if a live person answered the call to that telephone number. Further, in this case, a relative small number of bits are required to indicate these two conditions, and furthermore, compression techniques can be used to compact the storage requirements even further. Although this also measures beginning and ending of speech, it is distinct from the time-based analysis described in FIG. 1, and this approach is another method for generating AMD meta-data.

Energy Distribution AMD Meta-Data Mapping

This approach is illustrated on the next row 1080. In this approach, a relative energy level of the speech is characterized in each time period. This is represented by the symbols $e_1$ 1081, etc. The absence of energy is shown by a null symbol "-" 1085. Thus, a mapping of the relative energy levels is developed. Although only three energy levels are shown, namely $e_1$, $e_2$ and $e_3$, there may be in fact, a greater number of energy levels reported, depending on how granular the measurement may be. Again, encountering the same greeting on a subsequent call would provide an AMD meta-data mapping that is likely to be comparable to one previously derived for that same greeting, but unlikely to match a greeting provided by a live person answering the call, which would likely result in a different AMD meta-data mapping.

This mapping, as with the prior mappings, provides a time-dependent mapping of an audio characteristic of the greeting audio snippet of some sort and as a function of time. This provides a time-dependent, characteristic dependent, mapping of the greeting, which facilitates comparison of the audio on a subsequent call to that number. In other embodiments, a number of parallel analysis can be done, which further provides characteristic data, to further increase the accuracy. Further, a number of other processing methods known to those skilled in the art could be done to derive a unique characteristics of the greeting that could be compared when the greeting is encountered on a subsequent call. In fact, a number of such analysis can be done, and the comparison may use various algorithms for "voting" in order to ascertain whether the detected audio greeting matches the AMD meta-data previously obtained for that telephone number. For example, if one set of AMD meta-data is similar, but slightly different, then one or two other sets of AMD meta-data can be used and compared. For example, the energy level AMD meta-data mapping 1080 may vary slightly based on network carrier characteristic, such that the detected energy levels of a greeting may be slightly different when calling the same number at a subsequent time, though the relative timings would likely be similar. In other words, the same greeting encountered at different times may have the same timing, but the energy levels may be slightly different because of the carrier infrastructure used on the different calls.

Those skilled in the art can readily ascertain in light of the present disclosure, a number of such mappings could be quickly and easily obtained for a greeting and stored as AMD meta-data, and subsequently used for determining whether a subsequently encountered greeting has the same characteristics as the earlier greeting.

Semantic AMD Meta-Data Mapping

Another approach is to perform an analysis of the speech that is more linguistic focused. In this approach, the audio of the speech is analyzed on a linguistic level, specifically to identify phonemes that are present in the speech. Phonemes are basic, fundamental sounds used in a language. While linguistic experts have defined a set of 44 phonemes for the English language, the set used by a RTSA component may be greater. Regardless of the set used by the RTSA component, the RTSA is configured to ascertain a phoneme-by-phoneme mapping of audio. In this case, it can be applied to a greeting. This is represented by the last row 1090 in FIG. 10, which shows standardized phonemes 1081 and 1085 for the word "hello" and phonemes 1088 for the word "please." These are represented using one industry accepted format for phonemes for these words, but other formats and representations may be used. A RTSA component may have a greater number of phonemes, and their definition may be proprietary.

The phoneme based AMD meta-data mapping approach may capture a time aspect by capturing the phonemes with respect to the time periods. In other embodiments, the AMD meta-data mapping may simply capture be the sequence of the phonemes. By determining a phoneme mapping of audio encountered (however this is done), a comparison of current audio of a greeting can be compared with that of a prior determination of a known machine originated greeting. It is expected that a person answering a call would not use the same greeting as found on an AVMC, so that the phoneme sequence would not match. On the other hand, if the same machine greeting is encountered, the phoneme sequence would be expected to match.

The above approaches illustrate various ways that an RTSA system, or some other component, could be used to analyze the audio of a greeting in a more sophisticated manner. No doubt those skilled in the art of speech comparison techniques could readily develop alternative techniques that could be used, and such techniques could be used to practice the concepts and technologies herein as well. Thus, a variety of technologies could be used to obtain a unique "signature" of a known machine provided greeting that is stored and used when calling the same telephone number at a subsequent time to ascertain if the subsequently provided greeting is also provided by a machine.

Figure 11:
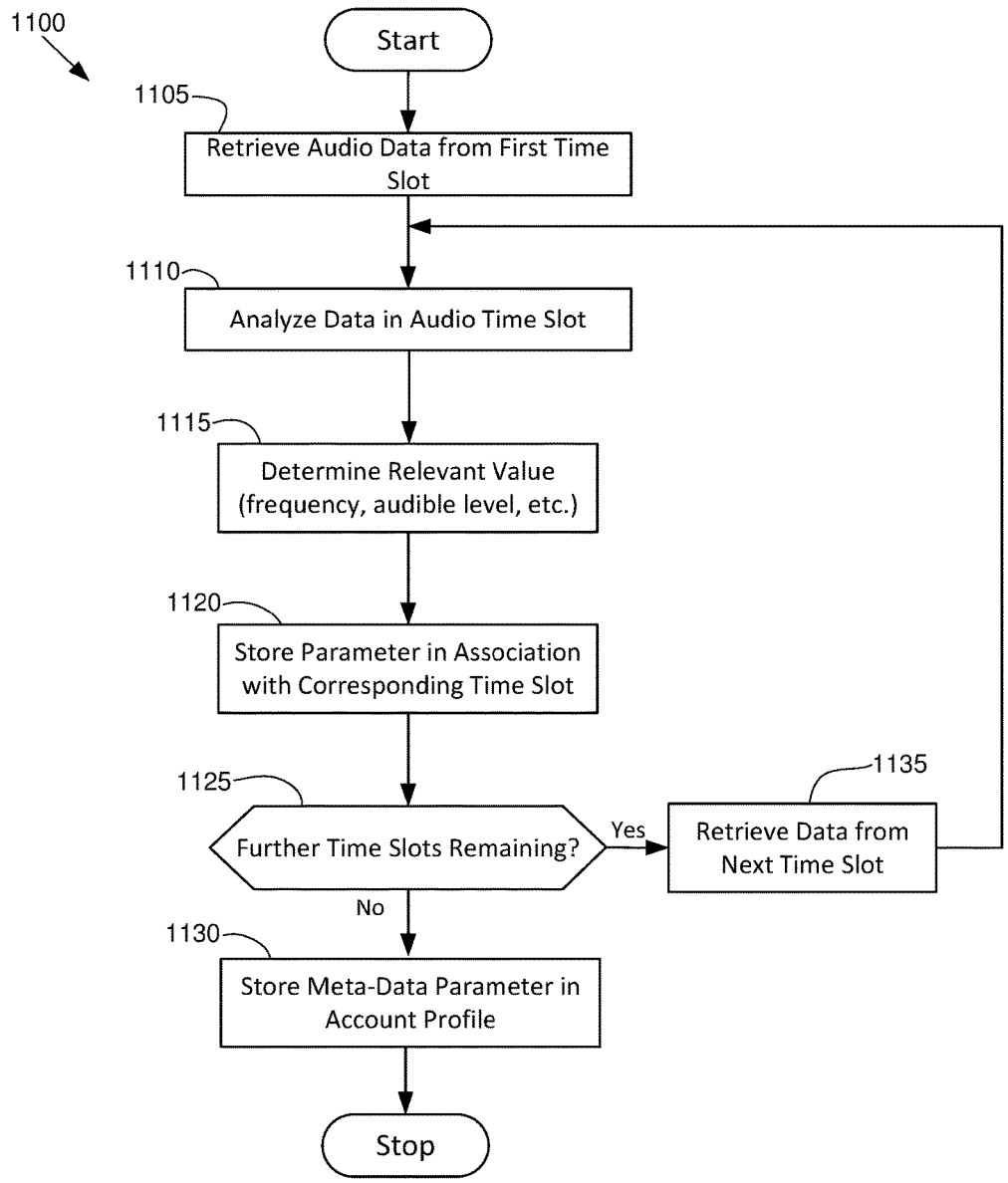
FIG. 11 illustrates one process flow for processing a greeting to determine AMD meta-data.

One embodiment for the process for obtaining the AMD meta-data mapping is shown at a high level in process 1100 of FIG. 11. The process assumes that the audio snippet of the greeting is stored in memory for processing. The process begins with retrieving the audio data of the first time slot of the greeting in operation 1105. That audio data is analyzed, according to which ever technique is selected in operation 1110. As discussed above, a variety of technologies, algorithms, and approaches may be used. The relevant data value is determined in operation 1115, and is stored as AMD meta-data for that time slot in operation 1120. Next, a decision is made as to whether additional time slots remain to be analyzed in operation 1125. If so, then audio data from the next time slot is retrieved in operation 1135 and the process loops back to operation 1110, where the process repeats. If there are no more time slots remaining, then the AMD meta-data is stored in conjunction with the account (i.e., the telephone number) in operation 1130. The process is then completed. This process creates the AMD meta-data that characterizes an audio greeting, which can be used on subsequent calls to ascertain if the greeting is from a machine.

Figure 12:
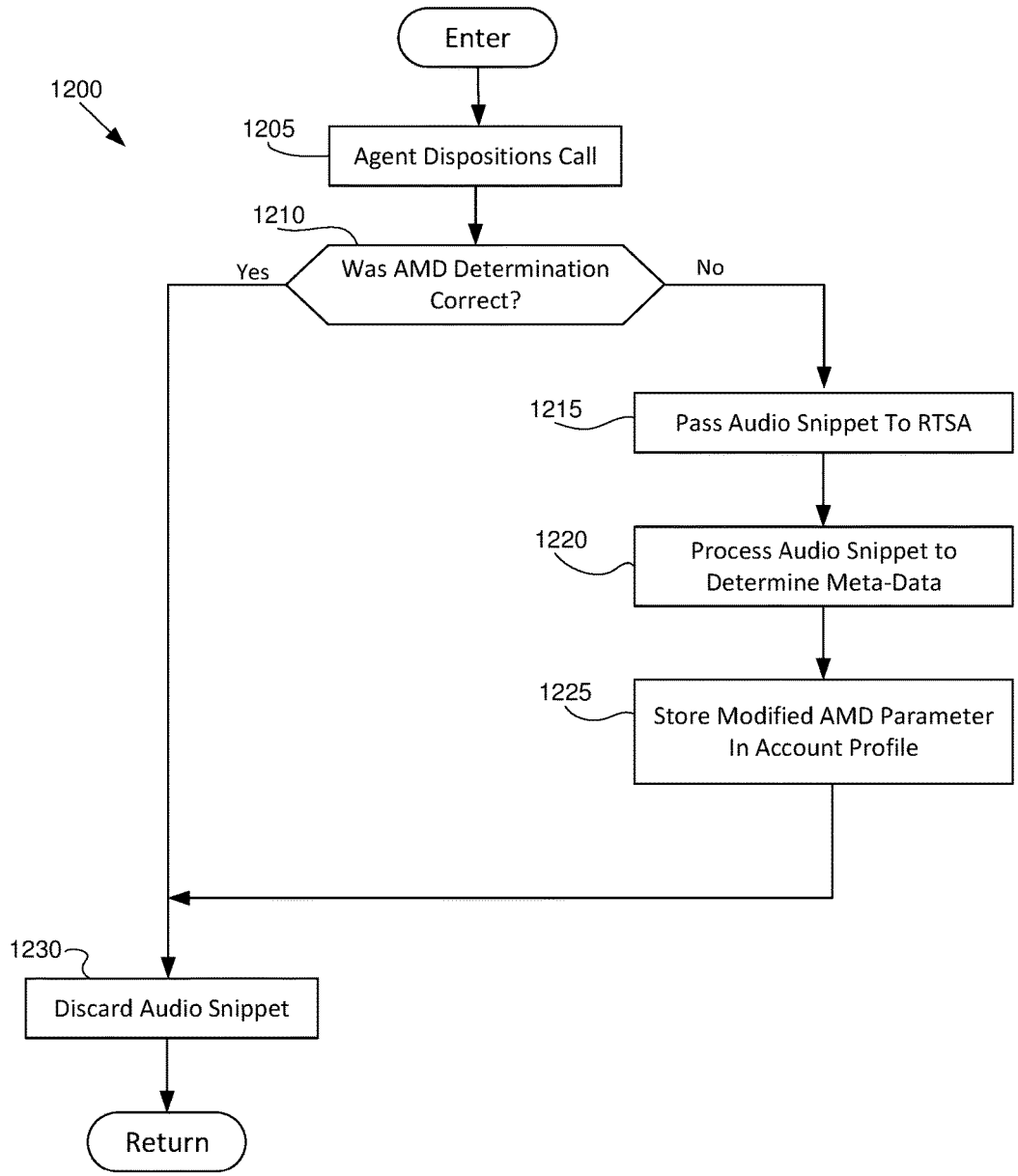
FIG. 12 illustrates one embodiment of a process flow for initiating and obtaining AMD meta-data using a RTSA component.

This process of analyzing the audio snippet may be initiated as shown in FIG. 12. Turning to FIG. 12, the process 1200 picks up during the point where a call that has been originated, determined to be a live person, and the agent is connected to the call. Further, the process presumes that that audio greeting is retained for potential analysis. At the end of the call, the agent will disposition the call. This involves the agent entering data to their computer workstation indicating aspects of the voice call they just handled. Typically, this happens immediately after the call is terminated, but may occur while the agent is still connected. The agent will indicate, in some manner, that the AMD determination was correct in operation 1210. For example, if the agent was actually speaking to a live person, then the AMD determination that the audio greeting was from a live person was correct. If so, then agent may disposition the call in various ways that indirectly indicates a live person was reached. The process then discards the audio snippet in operation 1230.

If the AMD determination is incorrect in operation 1210, which may be indicated directly or indirectly by the agent, then the process continues by providing the stored audio snippet to the RTSA component for analysis in operation 1215. Next, the audio snippet is processed to ascertain the AMD meta-data mapping in operation 1220. The AMD meta-data is then stored in the account profile in conjunction with the dialed telephone number in operation 1225. In various embodiments, the control and management of the RTSA system may involve the AMD analysis module. Thus, one skilled in the art would understand that passing the audio snippet to the RTSA component in operation 1215 may actually involve passing it to the AMD analysis module, which in turn provides it to the RTSA module.

The processing shown in operations 1215-1225 may occur in real-time, as described above. However, it may also occur in non-real time. In this case, the audio snippets are retained in temporary memory or in a file. A list of calls where the AMD determination was incorrect may be generated at the end of the day. For each instance, the corresponding audio snippet may be retrieved from memory, and processed to ascertain the AMD meta-data. This may shift some of the processing required by the RTSA during peak calling hours to non-peak hours. Once each set of AMD meta-data is determined, it is then stored in a profile associated with the telephone number of that account. Then, upon subsequent calls to that number, the AMD meta-data may be retrieved and used in analyzing the greeting.

Architecture for Using RTSA Components to Supplement AMD Analysis

Figure 13:
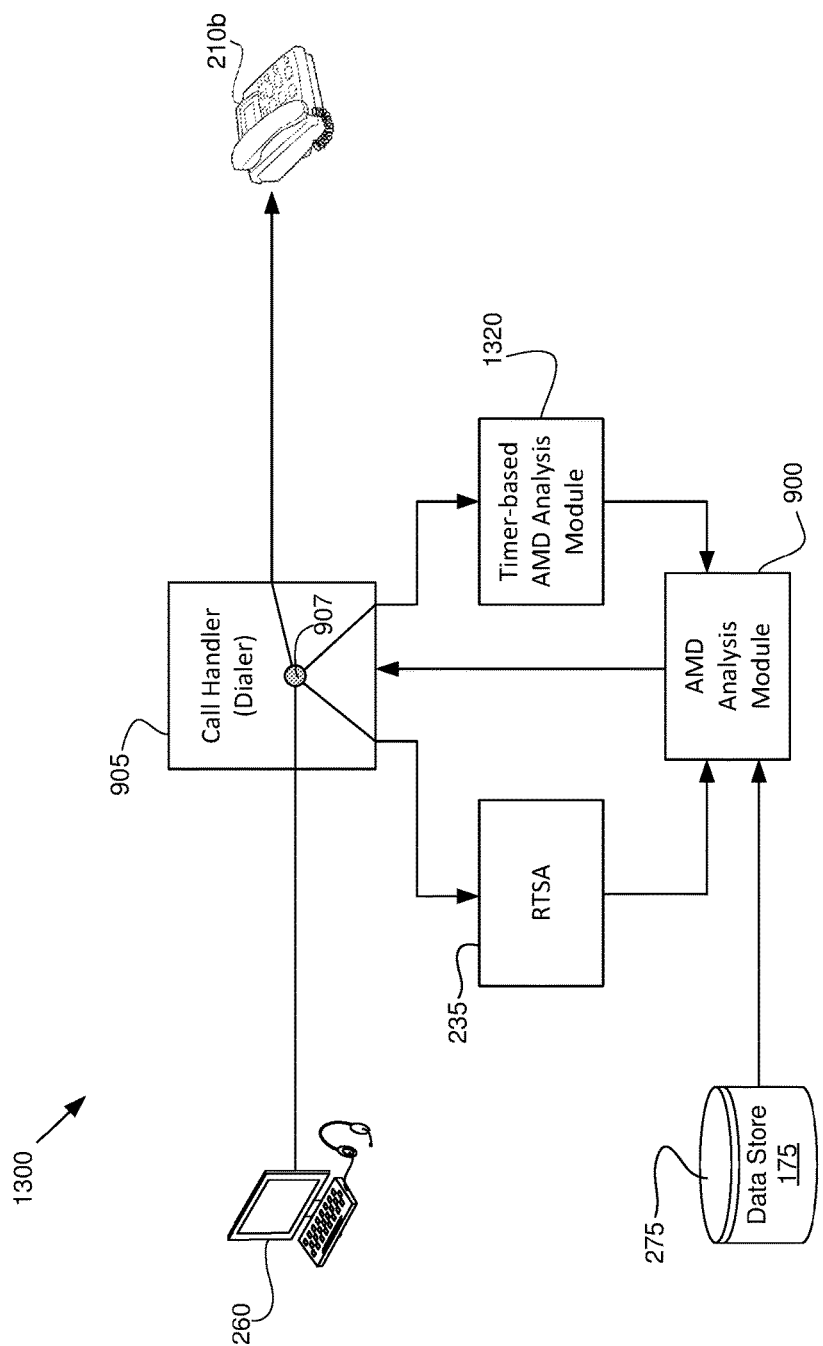
FIG. 13 illustrates one embodiment of an architecture for using a RTSA component along with a timer-based AMD analysis module to improve the determination of whether a greeting originated from a live person or a machine.

FIG. 13 shows another embodiment of using an RTSA component to perform AMD analysis. This is similar to FIG. 9, but represents using the RTSA to augment or supplement other forms of AMD analysis. It can also represent an evolution in AMD analysis, since many contact centers already have a non-speech form of AMD analysis of some form (e.g., typically a timer-based form of analysis).

The system 1300 of FIG. 13 comprises the call handler 905 that originates the call leg to the called party, represented by telephone 210b. This call leg is illustrated as connected to the conference bridge 907 in order to allow the audio signals of the answering entity to be provided to both the RTSA component 235 and a timer-based (i.e., non-linguistic) AMD analysis module 1320. In some embodiments, the timer-based AMD analysis module 1320 may be an existing or conventional AMD analysis function based on the relative silence/voice detected in an audio stream, previously discussed. The timer-based AMD analysis module 1320 may be integrated into the call handler in other embodiments. Such a timer-based AMD analysis module does not operate by analyzing the content or semantics of the speech, but does provide an input to the AMD analysis module 900 that is used in determining whether the audio is from a live person or machine. This may use the techniques discussed earlier in conjunction with FIG. 1. Similarly, the RTSA component 235 also provides data to the AMD analysis module 900 that is used in determining whether the audio is from a live person or a machine. This may include generated AMD meta-data of the current encountered greeting. The AMD analysis module may also retrieve AMD meta-data from a data store 175 that is used in evaluating and comparing the AMD meta-data generated by the RTSA component.

The system shown in FIG. 13 can be used in various ways. Not all embodiments are explicitly detailed herein. One embodiment involves using either the RTSA system or the timer-based AMD analysis module. The choice depends on whether AMD meta-data for the telephone number has been previously obtained and is stored in the data store. One embodiment of this process is illustrated in FIG. 14.

Figure 14:
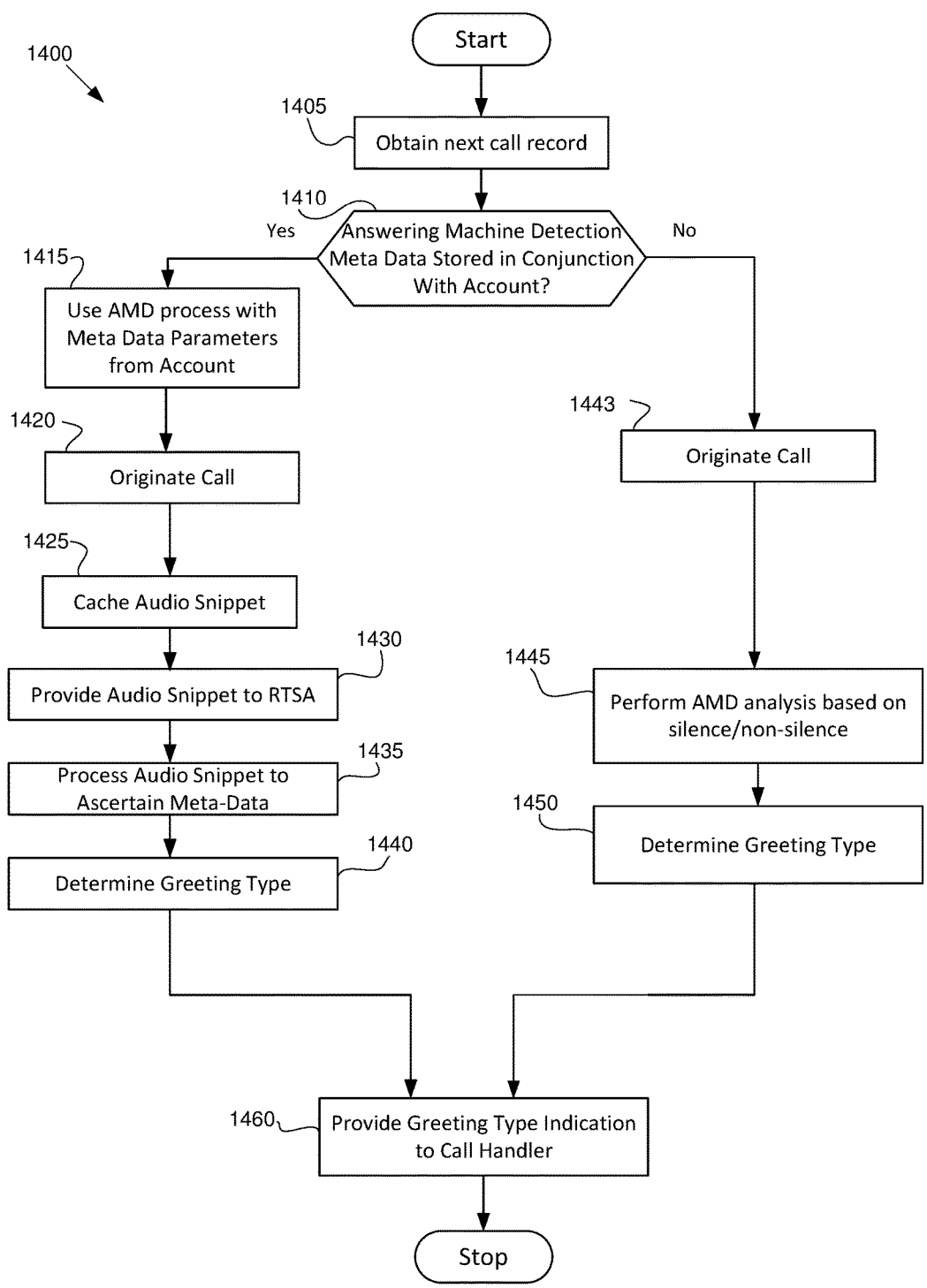
FIGS. 14-15 illustrates embodiments of a process flow involving use of a RTSA component along with a timer-based AMD analysis module to determine whether a greeting originated from a live person or a machine.

Turning to FIG. 14, the process begins with retrieving a call record from a calling list in operation 1405. The process determines whether that call record, telephone number, or account has, indicates in some manner, or is associated with, the existence of previously generated AMD meta-data for a greeting associated with that telephone number in operation 1410. If there is none, then the process continues by originating the call in operation 1443. This path represents the existing procedures for connecting the call and ascertaining whether the greeting is from a machine or a live person. Thus, the next operation shown is performing the AMD analysis using the audio data to analyze the relative time periods of silence and non-silence in operation 1445. From this a determination of a greeting type is made in operation 1450, and that indication is provided to the call handler in operation 1460. The call handler will connect the call to the agent if it is determined to be a live person, or terminate the call (or perform some other action) if it is a machine.

Although not shown, if a subsequent disposition of the call from the agent indicates an error occurred, i.e., the determination of a live person was incorrect, then the process shown in FIG. 12 be invoked. This would result in generating AMD meta-data for that telephone number. On the other hand, if the process outcome is correct, then the process terminates. (In other embodiments, the next record is obtained, and the process repeats until it terminates.)

If however, after retrieving the call record in operation 1405 it is determined there is AMD meta-data associated with the account, telephone number, call record, or called party in some manner, then that information is retrieved and provided to the RTSA component (or the AMD analysis module) in operation 1415. The AMD meta-data would be present if a prior determination using the existing AMD process resulted in an error. The call is then originated in operation 1420, and the audio greeting obtained (assuming of course, the call is answered). The audio snippet is provided by the call handler via the conference bridge to the RTSA component in operation 1430. Thus, the RTSA component will analyze the audio to determine the AMD meta-data in operation 1435. This may be any of the aforementioned techniques, described in FIG. 10, but must be the same technique used to generate the stored AMD meta-data that is retrieved for comparison. The AMD meta-data determined by the RTSA component may be passed to the AMD analysis module, which also has the previously stored AMD meta-data, and the two are compared in operation 1440 to determine the greeting type. Specifically, if the AMD meta-data generated by the RTSA component for the audio snippet of the current call matches the stored AMD meta-data, or is deemed similar enough to be considered a match, then the current audio snippet is presumed to be from a machine. This indication is then provided to the call handler in operation 1460.

In essence, the process 1400 determines whether there has been a prior analysis of an audio snippet determined to be a machine greeting. If so, then the stored AMD meta-data is retrieved from that associated account when a subsequent call is established and answered to the number. The RTSA component then analyzes the greeting for the same type of parameters and compares them to the stored value. However, if there is no AMD meta-data stored, then the existing conventional procedures are used. Thus, this approach relies on using the existing procedures if there is no AMD meta-data stored in the account and using the enhanced RTSA/AMD analysis module procedures if there is AMD meta-data in the account.

Figure 15:
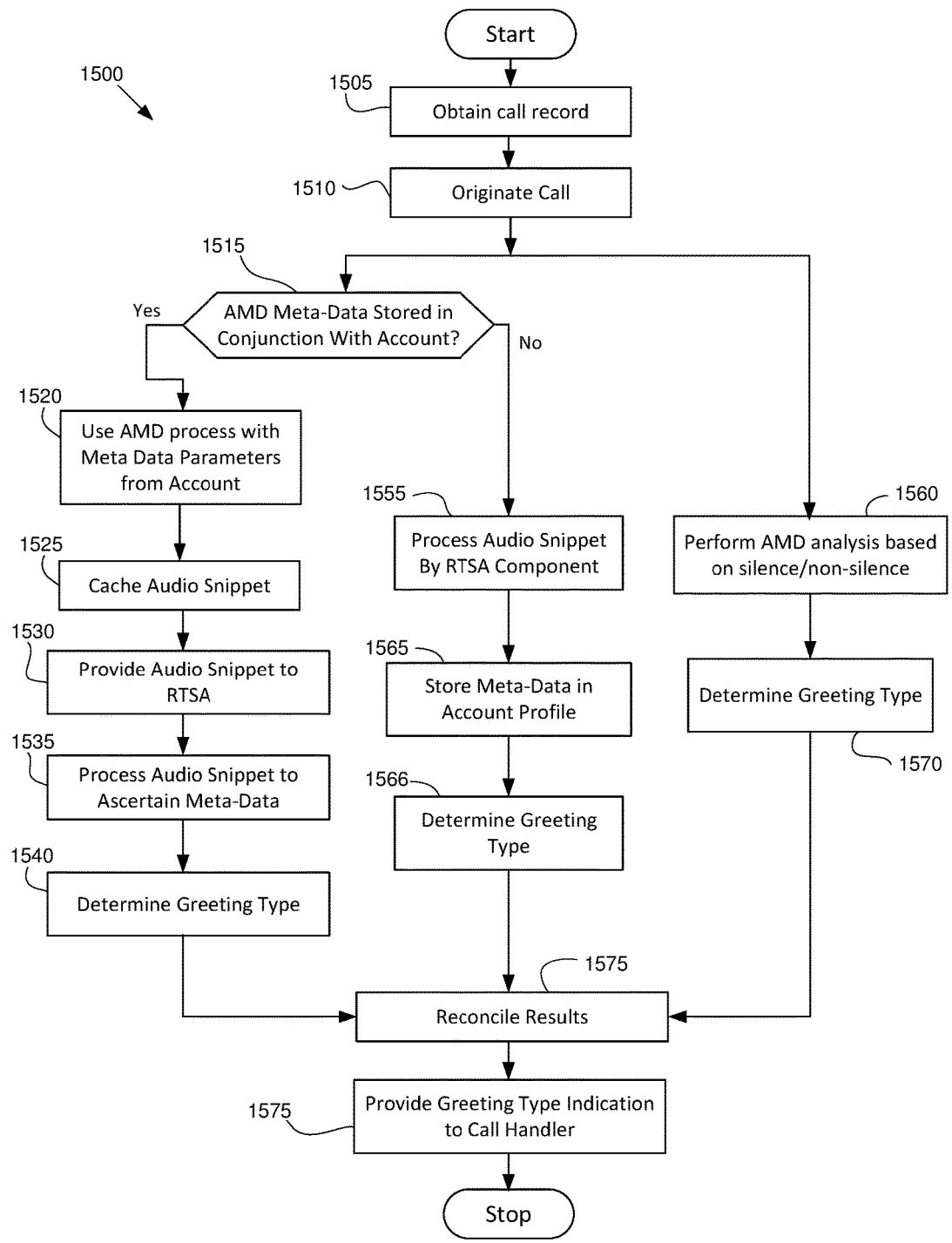

Another embodiment is shown in FIG. 15. In this embodiment, both the RTSA and conventional AMD processes are used, regardless of whether there is prior AMD meta-data. However, how the RTSA/AMD Analysis module is used depends on whether there is stored AMD meta-data. The process 1500 begins with obtaining the call record in operation 1505 and originating the call in operation 1510.

The process then is shown as dividing, but in this case, both paths are followed. That is, the process continues both at operations 1515 and 1560 in parallel. The process that continues to operation 1560 represents the conventional timer-based AMD analysis performed using the detection of silence/non-silence (i.e., voice). From this, a determination is made in operation 1570 as to whether the greeting is from a machine or voice. The results are provided to the AMD analysis module in operation 1575, where it will reconciles the results from the other input in some manner.

Simultaneously, the process flows to the decision in operation 1515. There, a test is made as to whether there is AMD meta-data stored in conjunction with the account. This could be, e.g., AMD meta-data stored in conjunction with the telephone number specifically, or some indication in the call record or other source that AMD meta-data is associated with the account, telephone number, carrier, or other characteristic that the called number is associated with. If there is, then the process continues by retrieving the AMD meta-data for use in the AMD processing in operation 1520. The audio snippet is cached for further processing in operation 1525. The audio snippet is then provided to the RTSA component in real-time in operation 1530. The RTSA performs the analysis and provides the results to the AMD analysis module in operation 1535. The AMD analysis module performs a preliminary analysis of the greeting type in operation 1540. This is a preliminary analysis, because in this embodiment, the AMD analysis module is also the entity that reconciles the results in operation 1575. Turning to that operation 1575, the results from the RTSA analysis (operations 1520-1540) are reconciled with the results performed in operation 1560-1570.

If however, there is no AMD meta-data stored or indicated in the call record in operation 1515, then this means there is no prior AMD meta-data to analyze. However, that does not mean that the RTSA component cannot perform an analysis on the greeting. The audio snippet greeting is provided and processed by the RTSA in operation 1555. There may be more than one type of analysis performed at this step. A first analysis may be to process the audio snippet to ascertain the AMD meta-data so that it is available for subsequent call processing. These results are stored as AMD meta-data in the account in operation 1565. This could be accomplished in various ways, including indicating the AMD meta-data is associated with the telephone number, the account, or call record, using a variety of indicators and/or data structures. While that analysis performs an initial analysis of the audio greeting to characterize it via meta-data, that analysis does not by itself indicate whether it is a machine greeting or live person greeting.

Additional processing may occur at operation 1555 to determine whether the audio snippet is a greeting from a machine. This may involve analysis of the phonemes, e.g., to determine the number and type of words being uttered. If the number words is greater than a threshold, then this suggests a machine greeting. This analysis, while similar to the silence/non-silence type of analysis, is more accurate in its results. That is because words spoken quickly without a pause are not registered as separate words using a silence/non-silence analysis, but a phoneme analysis can distinguish multiple words with minimal pausing. Further, the phoneme analysis can detect phonemes which may commonly be expected on a machine greeting, such as "record" "please" "after", etc. The detection of phonemes is an improvement over detecting text, because phoneme matching is faster.

Text-based analysis requires analyzing the phonemes to develop words, and typically several words have to be analyzed in order to properly ascertain the text. The combination of the number of phonemes, their order, and the words themselves may suggest that the audio snippet is a machine greeting. This analysis occurs in operation 1566. The results are then reconciled in operation 1575. It is apparent that the operations shown in operations 1555 and 1565 can occur in reverse order.

The reconciliation occurring in operation 1575 uses the results from the RTSA AMD processing and conventional timer-based AMD process. The reconciliation is straightforward if both indications suggest the same outcome. The reconciliation process is more involved if the indications are different, such as when the RTSA/AMD analysis module outcome indicates a machine and the conventional processing indicates a live person. Or, the RTSA/AMD analysis module outcome indicates a live person and conventional processing indicates a machine.

In such situations, a relative confidence indicator of each process could be used to weigh the outcomes of each result. In this case, if the determination does not exceed a threshold (e.g., 'highly confident') then the outcome may be given less weight. In another embodiment, the RTSA/AMD analysis may override the conventional AMD processing, since the RTSA/AMD analysis is likely to be more accurate. In such instances of conflicting indications, the audio recording may be stored and labeled for subsequent analysis. In other embodiments, a rule may be applied such that if there is a discrepancy in the two processes, treatment for encountering a live person should be the default treatment. Assuming there is a live person will result in the agent being connected to the call. This will avoid accidentally hanging up on a live person that may be the treatment if the greeting is incorrectly interpreted as an AVMC. Further, if a live person is presumed, but is incorrect, the agent can then disposition the call, and an updated analysis of the AMD meta-data may be performed.

Once a determination is made based on the two inputs, the AMD analysis module provides the indication to the call handler in operation 1575. The operation is then completed. The call handler will connect the agent or terminate the call as indicated by the determination. The process may be repeated for the next call record (not shown).

Storing AMD Meta-Data in Conjunction with an Account

In FIGS. 14 and 15, a test is defined (e.g., operations 1410 and 1515) that determines whether any specific AMD meta-data is to be applied. That AMD meta-data is to be applied could be ascertained by reviewing a flag or other indicator in the call record itself or in another data structure, which indicates that specific AMD meta-data is to be retrieved and applied. In one embodiment, a flag associated with the telephone number is included in the call record that indicates the existence of such AMD meta-data and indicates a location from which it can be retrieved. In other embodiments, account level information may be accessed, which may store or indicate such AMD meta-data for various numbers associated with the account. A variety of ways can be defined for providing such indications such that the processing of a call record results in retrieving and applying the AMD meta-data for that call. The AMD meta-data may be unique to the called telephone number or it may be common to a number of called telephone numbers. Thus, an AMT meta-data template (e.g., for a particular wireless carrier) could be indicated in the call record or account level information and applied. The process shown in FIGS. 14 and 15 are but one embodiment, and other embodiments are possible and intended to be within the concepts and technologies disclosed herein.

Procedures for Comparing AMD Meta-Data

The comparison of AMD meta-data stored in an account with that generated for a present call can rely on well-known techniques and procedures. There may be minor differences in the AMD meta-data obtained with that which is stored, based on the particular metrics used. These differences may be due to, in part, different carrier network's performances, which may impact a particular set of AMD meta-data, both in the values stored in the account and those obtained for the current call. For example, determining an energy level at various time slots of a greeting may be impacted by attenuation encountered by intervening carrier networks. Thus, two calls to the same number at different times may encounter the same greeting, but with slightly different energy levels. This is possible if analog networks are traversed, if equipment in the carrier's network is configured to alter the gain of the audio signal, or certain packets are delayed in transit, etc. Thus, a series of energy levels may be consistently a fraction of percent higher/lower when comparing AMD meta-data.

In other embodiments, certain digitized voice packets may have a slight time variation due to network congestion. Certain packets may be dropped and appear as silence. A comparison algorithm used to compare the AMD meta-data and should be configured to tolerate certain minor variations as such anomalies. For example, a silence may be a result of "dropped voice" packets. This may have a slightly different characteristic than silence as the result of a pause between words. The exact threshold as to how much of a difference can be tolerated will depend on a case-by-case analysis. For example, using shorter time periods when analyzing the AMD meta-data is likely to result in more discrepancies, but those may be relative minor in scale. Those skilled in the art will recognize some "fine tuning" may be required as to how strict of a comparison is required to determine whether there is a match or not.

Incorrect Determination that Greeting is from a Live Person

When comparing AMD meta-data stored in an account with AMD meta-data generated for a specific present call, it is possible that the comparison indicates there is no similarity of the results. Such an outcome may be due to, in some instances, too strict of a comparison. Some minor discrepancies are possible, as noted above.

However, there is one situation which will likely cause a mismatch. Namely, a machine greeting is analyzed and AMD meta-data is obtained and stored in the account. Then, the called party re-records or changes their AVMC greeting. When the new AVMC greeting is encountered in a subsequent call and used to generate AMD meta-data, the comparison with the stored AMD meta-data will likely result in a mismatch. This may cause the new greeting to be classified as originating from a live person, because the AMD meta-data does not match the old greeting. If so, the outcome will be that the agent will be connected to the call.

In such case, the agent will disposition the call as having been incorrectly classified. As discussed earlier, whenever an error is determined to have occur of this type, the audio snippet of the current call can be re-processed to obtain updated AMD meta-data, and it would replace the prior stored AMD meta-data. In this manner, AMD meta-data for an old machine greeting will be automatically updated and replaced with that of the new machine greeting. Upon a subsequent call to that same number, the AMD meta-data should then be similar. Thus, in this case an error will occur, but it will be corrected for the next call. Thus, this approach is somewhat "self correcting" when such errors are encountered.

Use of Various AMD Templates

A set of AMD data, whether it be timer-based values or AMD meta-data, used in a particular context, whether it be for all lists, a particular list, or a number on the list, may be referred to as a "template." Various AMD templates have been identified above. There may be a generic AMD template used for all calls, across various calling lists. In other applications, a particular template (call-specific list) could be used for dialing numbers in a particular calling list. The calling list could be, e.g., a list of numbers that are wireless numbers served by a particular wireless carrier. In such an application, there may be a template that is optimized for detecting greetings from that wireless carrier's voice mail systems. A calling list comprising wireless numbers from two or three wireless carriers may therefore use two or three corresponding AMD templates. The corresponding template would be used based on the carrier serving the number being dialed. As a new calling list for a new wireless carrier is loaded, an associated AMD template is loaded and used. As noted earlier, the calling list could be organized on some other basis and have an associated AMD meta-data template.

As noted earlier, there may be AMD template specific to a particular call to a number in the calling list. This could be the aforementioned AMD meta-data determined for a particular greeting when calling a particular telephone number. If so, then such a call-specific AMD template could be used, in lieu of a more generic version. For example, a calling list comprising wireless numbers may use a carrier-specific AMD template as a default template, but a wireless number specific template may be used when dialing that specific wireless number.

Figure 16:
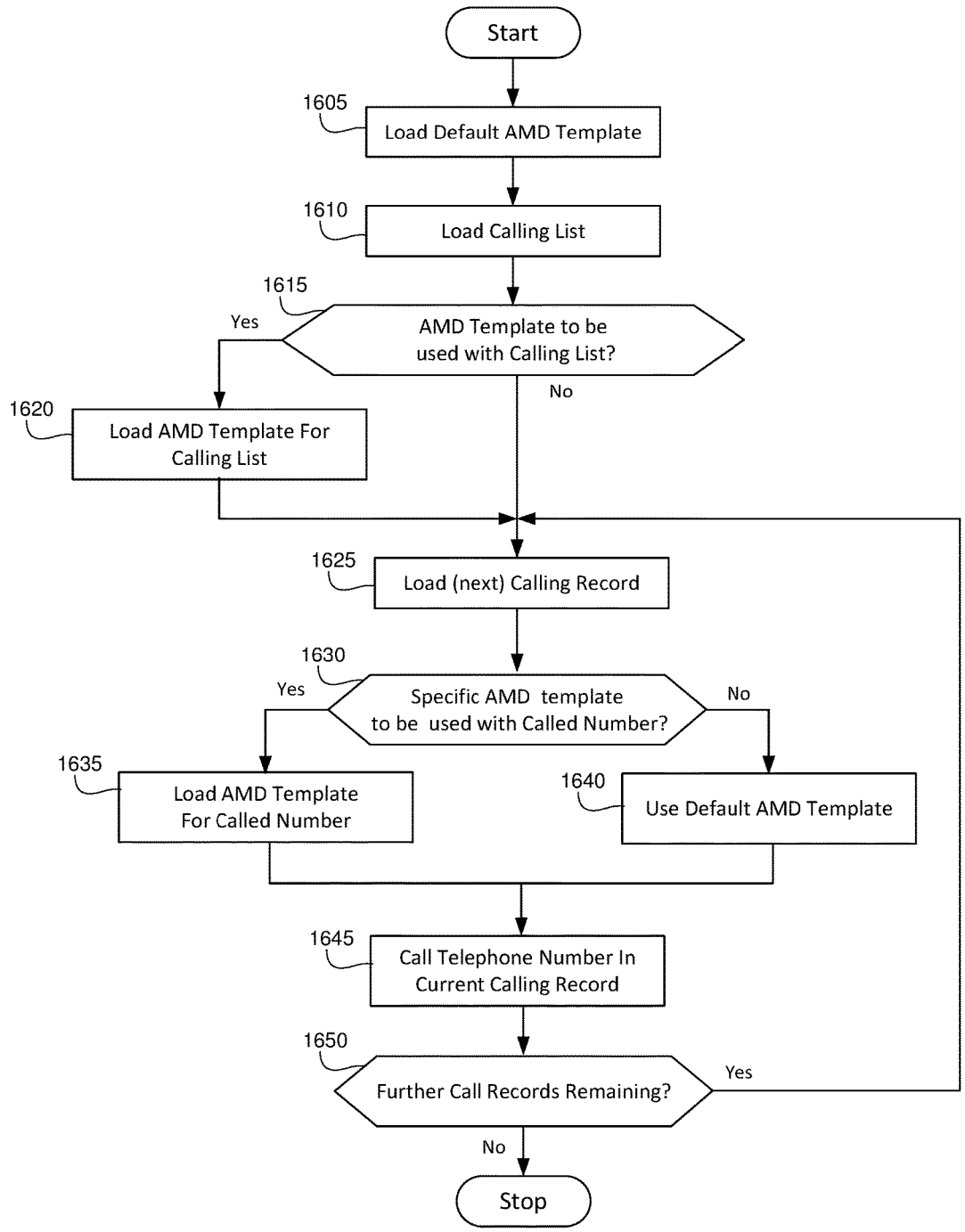
FIG. 16 illustrates one embodiment of how various AMD meta-data templates may be used when originating calls.

One embodiment of a process flow to illustrate how different AMD templates may be used is shown in FIG. 16. Turning to FIG. 16, the process begins with loading a default AMD template in operation 1605. This may be a template optimized for general usage that could generally apply to any number in the absence of more specific information.

Next, the particular calling list to be processed in loaded in operation 1610. That list may have an optimized AMD template associated with it. If so, as determined in operation 1615, that particular AMD template is loaded in operation 1620. This may be e.g., a template optimized for the carrier used in making calls to records in the calling list. It may be a template optimized for a particular demographic associated with the calling records in the list. Other variations are possible. If there is no particular template to be used, then the process continues from operation 1615 to operation 1625.

In operation 1625, the next appropriate calling record from the calling list is retrieved and processed for call origination. That calling record may indicate (in various ways) that a more specific AMD template may be associated in some manner with the telephone number to be dialed. If that determination is made in operation 1630, then that AMD template is loaded in operation 1635 and used. If not, then the presently applicable AMD template is used in operation 1640. The presently applicable AMD template may be a generic or list specific form, and it could be timer-based or meta-data based.

Next, the call to the telephone number is originated in operation 1645 and the selected ADM template is used to ascertain a greeting, if encountered, is from a machine or a live person. A determination is made in operation 1650 whether there are additional call records in the calling list to process. If so, the process loops back to retrieving the next call record in the calling list in operation 1625. If there are no more records, then the process is completed.

For purposes of this process flow, it is possible to have a mix of timer-based AMD parameters as a generic template used when e.g., processing a list, and then using a telephone number specific set of AMD meta-data. Or, a generic set of AMD meta-data may be used as a template for all calls, but replaced with a more specific AMD meta-data template for calls involving a specific wireless carrier, and replaced with a number-specific AMD meta-data template if one exists for a particular wireless number. Thus, it is possible to have a number of templates and types of AMD data involve when calling numbers on a list.

Exemplary Computer Processing Device

Figure 17:
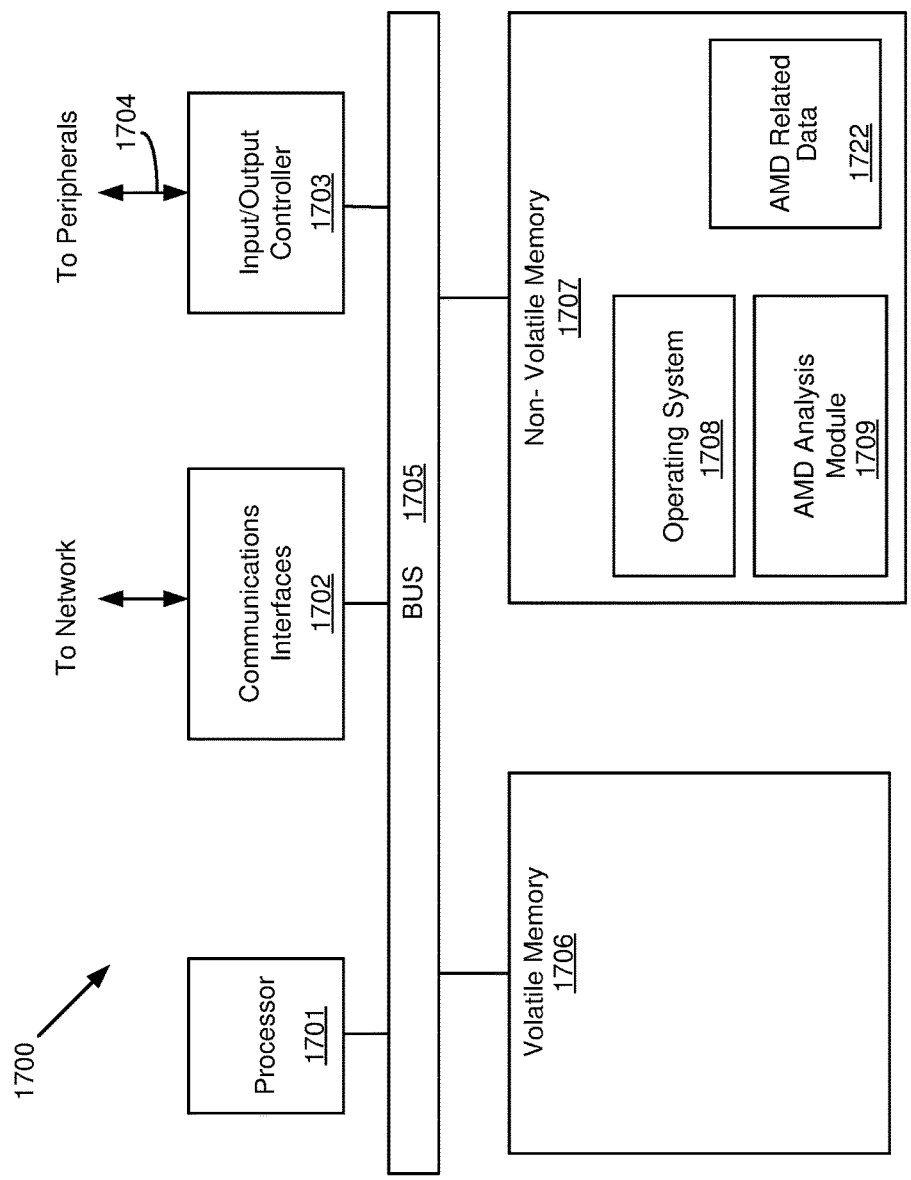
FIG. 17 illustrates one embodiment of a processing component that may be used in conjunction with the concepts and technologies presented herein.

FIG. 17 is an exemplary schematic diagram of a computer processing system that may be used in embodiments of various architectures, such as components shown in the architecture 200 of a contact center in FIG. 2 to practice the technologies disclosed herein. In general, the term "computer processing system" may be exemplified by, for example, but without limitation by any specially configured or programmed: personal computer, server, desktop computer, tablet, smart phone, notebook, laptop, distributed processing system, server, blade, and the like, as well as any combination of devices or entities adapted to perform the functions described herein, such that the resulting system is a specialized processing system configured to perform the functions and capabilities disclosed herein. The computer processing system may also be a specially configured system, designed to optimize the operation of the component in the contact center based in part on the specialized software configured to perform the functions disclosed herein. For example, the "communications handler" could be a computer processing system that is specially configured to perform the functions disclosed herein. A "communications handler" as used herein would be interpreted by one skilled in the art as a special purpose processing system, performing functions that are not typical of a generic computer. This also may be the case for the other components disclosed herein including the various dialing components, SMS gateway, RTSA components, dialing list storage systems, etc.

As shown in FIG. 17, the processing system 1700 may include one or more computing processors 1701 that may communicate with other elements within the processing system 1700 via a bus 1705. The computing processor 1701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. In many cases, in order to perform the necessary analysis, such as determining frequencies, energy level, etc. of the audio signal, this will requires something more than a general purpose computer processor, such as a DSP processor.

In one embodiment, the processing system 1700 may also include one or more communications interfaces 1702 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1703 may also communicate with one or more input devices or peripherals using an interface such as, but not limited to: a keyboard, a mouse, a touch screen/display input, microphone, pointing device, etc. The input/output controller 1703 may also communicate with output devices or peripherals, such as displays, printers, speakers, headsets, banner displays, etc.

The computing processor 1701 may be configured to execute instructions stored in volatile memory 1706, non-volatile memory 1707, or other forms of computer readable storage media accessible to the processor 1701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1707 may store program code and data, which also may be loaded into the volatile memory 1706 at execution time. For example, the non-volatile memory 1707 may store one or more modules 1709 that may perform the above-mentioned process flows and/or operating system code 1708 containing instructions for performing the process and/or functions associated with the technologies disclosed herein. The AMD analysis module(s) 1709 may also access, generate, process, or store related data 1722, including, for example, the data described above in conjunction with performing the various aspects of AMD analysis in the non-volatile memory 1707, as well as in the volatile memory 1706. This would include, but is not limited to: AMD meta-data, AMD parameter sets, timer values, account related data, call records, or any other data used to perform the disclosed functions and concepts. The volatile memory 1706 and/or non-volatile memory 1707 may be used to store other information including, but not limited to: records, applications, programs, scripts, source code, object code, byte code, compiled code, interpreted code, machine code, executable instructions, or the like. These may be executed or processed by, for example, the computing processor 1701 and may form a part of, or may interact with, the module(s) 1709. The module 1709 is shown as being the AMD analysis module, but it could be an RTSA processing module, timer-based AMD module, or any other module used to perform the concepts disclosed herein.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining whether a greeting detected on an answered outbound call from a contact center was provided by an automatic voice messaging capability (AVMC) or a live person, the method comprising:
   originating the call from a call handler in the contact center using a call record from a calling list indicating the telephone number, wherein the call record further indicates stored answering machine detection ("AMD") meta-data is associated with the telephone number; and
   processing the greeting by the contact center using the stored AMD meta-data to ascertain the greeting was provided by the AVMC or the live person.

2. The method of claim 1, wherein the stored AMD meta-data is obtained by processing a prior call to the telephone number, wherein a prior greeting is detected and analyzed to generate the stored AMD meta data.

3. The method of claim 1, wherein processing the greeting comprises:
   determining current AMD meta-data by processing the greeting;
   comparing the current AMD meta-data with the stored AMD meta-data; and
   ascertaining, based on the comparison of the current AMD meta-data with the stored AMD meta-data, that the greeting was provided by the AVMC.

4. The method of claim 1, wherein the current AMD meta-data comprises a set of time-based characteristics of the greeting.

5. The method of claim 2, wherein the stored AMD meta-data is obtained in response to the prior call to the telephone number dispositioned by an agent as having incorrectly determined the prior greeting was provided by a live person.

6. The method of claim 1, further comprising:
   terminating the call to the telephone number in response to ascertaining the greeting was provided by the AVMC, whereby an agent in the contact center is not connected to the call.

7. The method of claim 2, wherein the processing of the greeting to produce the current AMD meta-data is performed by a real-time speech analytics system bridged onto the call by a call handler in the contact center.

8. A system for determining whether a greeting detected on an answered outbound call from a contact center was provided by an automatic voice messaging capability (AVMC) comprising:
a dialer configured to:
originate the outbound call to a telephone number indicated in a call record, wherein stored Answering Machine Detection ("AMD") meta-data is associated with the telephone number, and
establish a call leg to a real-time speech analytics ("RTSA") component, wherein the call leg is bridged onto the call, wherein the greeting comprising audio data is provided to the RTSA on the call leg; and
the RTSA component configured to:
analyze the greeting to determine current AMD meta-data,
compare the current AMD meta-data with the stored AMD meta-data, and
based on the comparison of the current AMD meta-data with the stored AMD meta-data, provide a greeting type indication to the dialer that indicates whether the greeting was provided by the AVMC or a live person answering the call.

9. The system of claim 8, wherein the dialer is further configured to:
receive the greeting type indication;
if the greeting type indication indicates the greeting was provided by the AVMC, then terminate the call; and
if the greeting type indication indicates the greeting was provided by a live person answering the call, then connect an agent to the call.

10. The system of claim 8, wherein the RTSA component is further configure to:
generate the stored AMD meta-data by processing a prior greeting received on a prior call to the telephone number.

11. The system of claim 8, wherein the current AMD meta-data comprises a set of time-based characteristics derived from processing the audio data of the greeting.

12. The system of claim 10, wherein the RTSA component is further configured to:
generate the stored AMD meta-data in response to the prior call dispositioned by an agent indicating the prior greeting was incorrectly determined to be have been provided by the live person.

13. The system of claim 9, wherein the dialer is further configured to:
receive a disposition code from the agent after connecting the agent to the call in response to the greeting type indication indicating the greeting was provided by the live person, wherein the disposition code reflects the greeting was incorrectly classified as provided by the live person answering the call; and
instruct the RTSA component to process the greeting to provide updated stored AMD meta-data.

14. The system of claim 13, wherein the RTSA is further configured to:
replace the stored AMD meta-data with the updated stored AMD meta-data.

15. A non-transitory computer readable medium storing instructions that when executed by a processor cause the processor to:
receive a greeting comprising audio data transmitted on a call leg from a call originated by a dialer to a telephone number, wherein the call has been answered;
cause the greeting to be processed so as to generate current Answering Machine Detection ("AMD") meta-data representative of the greeting;
receive stored AMD meta-data of a prior call to the telephone number whereby a prior greeting was processed to generate the stored AMD meta-data;
compare the stored AMD meta-data with the current AMD meta-data; and
generate a greeting type indication indicating the greeting was provided by a live person or an automatic voice messaging capability ("AVMC").

16. The non-transitory computer readable medium of claim 15 wherein causing the greeting to be processed so as to generate the current AMD meta-data further causes the processor to:
generate a set of sequential time-based characteristics of the greeting.

17. The non-transitory computer readable medium of claim 15, wherein comparing the stored AMD meta-data with the generated AMD meta-data comprises:
determining a difference between a first set of sequential time-based characteristics with a second set of sequential time-based characteristics;
determining the difference is below a threshold; and
generating the greeting type indication indicating the greeting was provided by the AVMC.

18. The non-transitory computer readable medium of claim 15, wherein comparing the stored AMD meta-data with the generated AMD meta-data comprises:
determining a difference between a first set of sequential time-based characteristics with a second set of sequential time based characteristics;
determining the difference is above a threshold; and
generating the greeting type indication indicating the greeting was provided by the live person.

19. The non-transitory computer readable medium of claim 18, wherein the instructions further cause the processor to:
cause a second call leg to an agent to be connected to the call in response to the greeting type indication indicating the greeting was provided by the live person.

20. The non-transitory computer readable medium of claim 17, wherein the instructions further cause the processor to:
terminate the call in response to the greeting type indication indicating the greeting was provided by the AVMC.

* * * * *